United States Patent
Koga et al.

(10) Patent No.: US 8,405,954 B2
(45) Date of Patent: Mar. 26, 2013

(54) MONOLITHIC CERAMIC ELECTRONIC COMPONENT AND MOUNTING STRUCTURE THEREOF

(75) Inventors: Seiji Koga, Yasu (JP); Yukio Sanada, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/296,262

(22) Filed: Nov. 15, 2011

(65) Prior Publication Data

US 2012/0293908 A1 Nov. 22, 2012

Related U.S. Application Data

(63) Continuation of application No. 12/642,976, filed on Dec. 21, 2009, which is a continuation of application No. PCT/JP2008/061518, filed on Jun. 25, 2008, now Pat. No. 8,130,484.

(30) Foreign Application Priority Data

Jun. 27, 2007 (JP) ................................. 2007-169782

(51) Int. Cl.
*H01G 4/005* (2006.01)
*H01G 4/228* (2006.01)
*H01G 4/06* (2006.01)

(52) U.S. Cl. .................... 361/303; 361/306.3; 361/321.2

(58) Field of Classification Search ................ 361/301.4, 361/303, 321.2, 310, 306.3, 308.1
See application file for complete search history.

(56) References Cited

U.S. PATENT DOCUMENTS 6,326,239 B1 * 12/2001 Asai et al. ..................... 438/112
8,081,485 B2 * 12/2011 Wischnat ...................... 361/760

FOREIGN PATENT DOCUMENTS

| EP | 1519642 A1 | * | 3/2005 |
| JP | 04171708 A | * | 6/1992 |
| JP | 05135990 A | * | 6/1993 |
| JP | 06069063 A | * | 3/1994 |
| JP | 09050935 A | * | 2/1997 |
| JP | 09270360 A | * | 10/1997 |
| JP | 2000124059 A | * | 4/2000 |
| JP | 2001015373 A | * | 1/2001 |
| JP | 2004140183 A | * | 5/2004 |
| JP | 2005216955 A | * | 8/2005 |
| JP | 2006128283 A | * | 5/2006 |

OTHER PUBLICATIONS

Koga et al.; "Monolithic Ceramic Electronic Component and Mounting Structure Thereof"; U.S. Appl. No. 12/642,976, filed Dec. 21, 2009.

* cited by examiner

*Primary Examiner* — David M Sinclair
(74) *Attorney, Agent, or Firm* — Keating & Bennett, LLP

(57) ABSTRACT

A monolithic ceramic electronic component includes a first internal electrode including a first region extending to a first end surface and having a relatively large dimension in a width direction and a second region located at the side closer to a front end than is the first region and having a relatively small dimension in a width direction, wherein $d_1 > c_1 + ng$ (n represents a constant based on the size of the monolithic ceramic electronic component) is satisfied, where the distance from a first end point which is closest in the first region to the first side surface and which is closest to the second end surface to the second end surface is $d_1$, the distance between first and second wraparound portions is $g$, and the distance between a front end of the second wraparound portion and the second end surface is $c1$.

2 Claims, 8 Drawing Sheets

= 0 V/m OR MORE, AND LESS THAN $3.75 \times 10^4$ V/m

= $3.75 \times 10^4$ V/m OR MORE, AND LESS THAN $7.5 \times 10^4$ V/m

= $7.5 \times 10^4$ V/m OR MORE, AND LESS THAN $9 \times 10^4$ V/m

= $9 \times 10^4$ V/m OR MORE, AND LESS THAN $11.25 \times 10^4$ V/m

= $11.25 \times 10^4$ V/m OR MORE, AND LESS THAN $15 \times 10^4$ V/m

MONOLITHIC CERAMIC ELECTRONIC COMPONENT AND MOUNTING STRUCTURE THEREOF

BACKGROUND OF THE INVENTION

1. Field of the Invention

The present invention relates to a monolithic ceramic electronic component, e.g., a monolithic capacitor, and a mounting structure thereof. In particular, the present invention relates to a monolithic ceramic electronic component, which is mounted with an electrically conductive adhesive, and a mounting structure thereof.

2. Description of the Related Art

Recently, in order to reduce the environmental load, Pb-free solder including no Pb has been used to mount a monolithic ceramic electronic component. However, the melting point of the Pb-free solder is relatively high and, therefore, a treatment at high temperatures is required during soldering. As a result, cracking often occurs in a ceramic element assembly of the ceramic electronic component because of a difference in the thermal expansion coefficient between the ceramic element assembly and an external terminal electrode.

In addition, an electrically conductive adhesive other than solder has been disclosed. For the electrically conductive adhesive used for this type of purpose, a metal filler made from Ag or other suitable is added to a thermosetting resin, e.g., an epoxy resin. The thermosetting temperature of the electrically conductive adhesive is less than the melting point of the Pb-free solder. Therefore, when the electrically conductive adhesive is used to mount a ceramic electronic component, a thermal stress applied to the ceramic element assembly can be reduced. An example of monolithic ceramic electronic components that are compatible with such mounting using electrically conductive adhesive is disclosed in Japanese Unexamined Patent Application Publication No. 2002-203737.

FIG. 13 is a schematic front sectional view showing the structure of a monolithic ceramic electronic component described in Japanese Unexamined Patent Application Publication No. 2002-203737. Here, a monolithic ceramic electronic component 110 includes ceramic sintered body 113 in which first and second internal electrodes 111 and 112 are laminated with ceramic layers therebetween. First and second external electrodes 114 and 115 are arranged so as to cover first and second end surfaces of the ceramic sintered body 113. In the first and the second external electrodes 114 and 115, a first electrode layer 121 and a second electrode layer 122 are laminated. The glass frit content G1 in the first electrode layer 121, the thickness of the first electrode layer 121, the glass frit content G2 in the second electrode layer 122, and the thickness of the second electrode layer 122 are specified to be within specific ranges. Japanese Unexamined Patent Application Publication No. 2002-203737 discloses that the resistance to a stress generated during hardening of the electrically conductive adhesive and a stress due to bending of a substrate during mounting through the use of the electrically conductive adhesive can be improved.

Furthermore, Japanese Unexamined Patent Application Publication No. 9-50935 discloses a monolithic capacitor suitable for uses at medium and high voltages because the voltage at which leakage due to surface flashover in the air begins is increased. Here, first internal electrodes and second internal electrodes are arranged adjacently with ceramic layers therebetween. Each of the first and the second internal electrodes has a relatively wide portion that extends to an end surface of the ceramic sintered body and a relatively narrow portion connected to a front end side of the wide portion. This relatively narrow portion is overlapped with a relatively wide portion of the other internal electrode when the two electrodes are stacked with a ceramic layer therebetween and, thereby, a shielding effect is improved. Consequently, a field strength between the relatively narrow portion of the internal electrode and an external electrode different from the external electrode connected to the internal electrode is reduced.

Recently, as described in Japanese Unexamined Patent Application Publication No. 2002-203737, use of electrically conductive adhesive has been attempted for mounting of the ceramic electronic component. However, in the case in which a ceramic electronic component was mounted on a substrate using an electrically conductive adhesive, in practice, the characteristics of the ceramic electronic component are likely to be deteriorated. That is, even when the characteristics were measured at a ceramic electronic component stage and it was determined that the characteristics were good, when evaluation was performed after the ceramic electronic component was mounted using the electrically conductive adhesive, the characteristics deteriorated in some instances.

In this connection, in the monolithic capacitor described in Japanese Unexamined Patent Application Publication No. 9-50935, the internal electrode has the relatively wide portion and the relatively narrow portion. Therefore, the internal electrode described in Japanese Unexamined Patent Application Publication No. 9-50935 has a shape similar to the shape of the internal electrode according to a preferred embodiment of the present invention. However, Japanese Unexamined Patent Application Publication No. 9-50935 does not recognize or identify a problem when the monolithic ceramic electronic component is mounted using an electrically conductive adhesive.

SUMMARY OF THE INVENTION

To overcome the problems described above, preferred embodiments of the present invention provide a monolithic ceramic electronic component, in which deterioration of characteristics due to mounting does not readily occur when mounting on a substrate is performed using an electrically conductive adhesive, and a mounting structure thereof.

The inventors of the present invention conducted research on a phenomenon, in which characteristics deteriorate in when a monolithic ceramic electronic component is mounted on a substrate using an electrically conductive adhesive, and discovered that deterioration proceeded through the individual steps indicated by the following items (1) to (4).

(1) When mounting the monolithic ceramic electronic component on a substrate using the electrically conductive adhesive, the electrically conductive adhesive disposed between the substrate and a surface of the monolithic ceramic electronic component, which faces the substrate, is squeezed out laterally. A portion of the electrically conductive adhesive squeezed out comes into contact with the surface of a ceramic element assembly of the monolithic ceramic electronic component which faces the substrate that defines a lower surface.

(2) Due to an electric field generated between the electrically conductive adhesive in contact with the lower surface of the ceramic element assembly and the internal electrode defining a lowermost layer inside the ceramic element assembly and humidity that is present around the monolithic ceramic electronic component, Ag in the electrically conductive adhesive causes ion migration.

(3) $Ag^+$ ions generated through ion migration enter micropores in the ceramic element assembly, corrode the ceramic element assembly, and cause cracking.

(4) The cracking extends and the characteristics of the monolithic ceramic electronic component deteriorate due to a short circuit or other defect.

The squeezing out of the electrically conductive adhesive in the lateral direction and the contact of the electrically conductive adhesive with the lower surface of the ceramic element assembly occur readily as the size of the monolithic ceramic electronic component is reduced. This is because when the dimensions of the monolithic ceramic electronic component are relatively large, the radii of curvature of corner portions and ridge portions of the ceramic element assembly increase, the region into which the electrically conductive adhesive runs away is extended, and the electrically conductive adhesive does not readily reach the lower surface of the ceramic element assembly. On the other hand, it is believed that when the dimension of the monolithic ceramic electronic component is reduced, the size of the region into which the electrically conductive adhesive runs away is reduced and, therefore, the lower surface of the ceramic element assembly is reached more easily.

In addition, the migration of Ag easily occurred when the monolithic ceramic electronic component was mounted such that the internal electrodes are perpendicular or substantially perpendicular to the substrate surface. When the monolithic ceramic electronic component is mounted such that the internal electrodes are parallel or substantially parallel to the substrate surface, the internal electrode defining the lowermost layer in the ceramic element assembly is opposed to the electrically conductive adhesive that is squeezed out laterally, as described above, with the ceramic layer therebetween. On the other hand, when the monolithic ceramic electronic component is mounted such that the internal electrodes are perpendicular or substantially perpendicular to the substrate surface, the individual sides located on the substrate side of a plurality of internal electrodes are opposed to the electrically conductive adhesive, which is squeezed out laterally, with the ceramic layer therebetween. On the other hand, the electric field concentrates on the peripheral portions of the internal electrodes. Therefore, as described above, when the sides of the plurality of internal electrodes are opposed to the electrically conductive adhesive, migration easily proceeds.

Based on the new discoveries described above, the inventors of the present invention considered that if deterioration of the characteristics caused by the migration of Ag was prevented when a voltage was applied during mounting, a monolithic ceramic electronic component that is suitable for mounting using an electrically conductive adhesive could be provided. As a result, preferred embodiments of the present invention have been developed.

A first preferred embodiment of the present invention provides a monolithic ceramic electronic component having an outside dimension of about 2.00±0.10 mm×about 1.25±0.10 mm×about 1.25±0.10 mm, a second preferred embodiment of the present invention provides a monolithic ceramic electronic component having an outside dimension of about 1.60±0.10 mm×about 0.80±0.10 mm×about 0.80±0.10 mm, a third preferred embodiment of the present invention provides a monolithic ceramic electronic component having an outside dimension of about 1.00±0.05 mm×about 0.50±0.05 mm×about 0.50±0.05 mm, a fourth preferred embodiment of the present invention provides a monolithic ceramic electronic component having an outside dimension of about 0.60±0.03 mm×about 0.30±0.03 mm×about 0.30±0.03 mm, and a fifth preferred embodiment of the present invention provides a monolithic ceramic electronic component having an outside dimension of about 0.40±0.02 mm×about 0.20±0.02 mm×about 0.20±0.02 mm.

The first preferred embodiment of the present invention is a monolithic ceramic electronic component including a ceramic element assembly including a plurality of laminated ceramic layers and including first and second principal surfaces which extend parallel or substantially parallel to the ceramic layers and which are opposed to each other, first and second side surfaces, which connect the first and the second principal surfaces and which are opposed to each other, and first and second end surfaces, which connect the first and the second principal surfaces and which are opposed to each other, first internal electrodes, which are disposed between the ceramic layers in the ceramic element assembly and which extend to the first end surface, second internal electrodes, which are disposed between the ceramic layers in the ceramic element assembly, which extend to the second end surface and, furthermore, which are electrically insulated from the first internal electrodes with at least one layer of the ceramic layer therebetween, a first external terminal electrode including a first end surface portion, which is arranged on the first end surface so as to be electrically connected to the first internal electrodes, and a first wraparound portion, which is connected to the first end surface portion and which extends onto the first and the second principal surfaces and the first and the second side surfaces, and a second external terminal electrode including a second end surface portion, which is electrically connected to the second internal electrodes and which is disposed on the second end surface, and a second wraparound portion, which is connected to the second end surface portion and which extends onto the first and the second principal surfaces and the first and the second side surfaces, and having an outside dimension of about 2.00±0.10 mm×about 1.25±0.10 mm×about 1.25±0.10 mm, wherein the first internal electrode includes a first region that extends to the first end surface and a second region, which is connected to the first region and which is arranged inward from the first region in the ceramic element assembly, while the dimension in the width direction of the second region is less than the dimension in the width direction of the first region, and where the first side surface is defined as a mounting surface, $d_1 > c_1 + 0.07$ g is satisfied, where the distance between a front end of the second wraparound portion and the second end surface is $c_1$, the distance from a first end point, which is closest in the first region to the first side surface and which is closest to the second end surface, to the second end surface is $d_1$, and the distance between the first and the second wraparound portions is g.

Furthermore, in the first preferred embodiment, the second internal electrode preferably includes a third region that extends to the second end surface and a fourth region, which is connected to the third region and which is inward from the third region in the ceramic element assembly, while the dimension in the width direction of the fourth region is less than the dimension in the width direction of the third region, and $d_2 > c_2 + 0.07$ g is satisfied, where the distance between a front end of the second wraparound portion and the first end surface is $c_2$, and the distance from a second end point, which is closest in the third region to the first side surface and the first end surface, to the first end surface is $d_2$.

The second preferred embodiment of the present invention provides a monolithic ceramic electronic component including a ceramic element assembly including a plurality of laminated ceramic layers and including first and second principal surfaces, which extend parallel or substantially parallel to the ceramic layers and which are opposed to each other, first and second side surfaces, which connect the first and the second principal surfaces and which are opposed to each other, and first and second end surfaces, which connect the first and the second principal surfaces and which are opposed to each other, first internal electrodes, which are disposed between the ceramic layers in the ceramic element assembly and which extend to the first end surface, second internal electrodes, which are disposed between the ceramic layers in the ceramic element assembly, which extend to the second end surface, and which are electrically insulated from the first internal electrodes with at least one layer of the ceramic layer therebetween, a first external terminal electrode including a first end surface portion, which is disposed on the first end surface so as to be electrically connected to the first internal electrodes, and a first wraparound portion, which is connected to the first end surface portion and which extends onto the first and the second principal surfaces and the first and the second side surfaces, and a second external terminal electrode including a second end surface portion, which is electrically connected to the second internal electrodes and which is disposed on the second end surface, and a second wraparound portion, which is connected to the second end surface portion and which extends on the first and the second principal surfaces and the first and the second side surfaces, and having an outside dimension of about 1.60±0.10 mm×about 0.80±0.10 mm×about 0.80±0.10 mm, wherein the first internal electrode includes a first region extending to the first end surface and a second region, which is connected to the first region and which is disposed inward of the first region in the ceramic element assembly, while the dimension in the width direction of the second region is less than the dimension in the width direction of the first region, and where the first side surface defines a mounting surface, $d_1 > c_1 + 0.10$ g is satisfied, where the distance between a front end of the second wraparound portion and the second end surface is $c_1$, the distance from a first end point, which is closest in the first region to the first side surface and which is closest to the second end surface, to the second end surface is $d_1$, and the distance between the first and the second wraparound portions is g.

In the second preferred embodiment, the second internal electrode preferably includes a third region extending to the second end surface and a fourth region, which is connected to the third region and which is disposed inward of the third region in the ceramic element assembly, while the dimension in the width direction of the fourth region is preferably set to be less than the dimension in the width direction of the third region, and $d_2 > c_2 + 0.10$ g is satisfied, where the distance between a front end of the second wraparound portion and the first end surface is $c_2$, and the distance from a second end point, which is closest in the third region to the first side surface and the first end surface, to the first end surface is $d_2$.

The third preferred embodiment of the present invention provides a monolithic ceramic electronic component including a ceramic element assembly including a plurality of laminated ceramic layers and including first and second principal surfaces, which extend parallel or substantially parallel to the ceramic layers and which are opposed to each other, first and second side surfaces, which connect the first and the second principal surfaces and which are opposed to each other, and first and second end surfaces, which connect the first and the second principal surfaces and which are opposed to each other, first internal electrodes, which are disposed between the ceramic layers in the ceramic element assembly and which extend to the first end surface, second internal electrodes, which are disposed between the ceramic layers in the ceramic element assembly, which extend to the second end surface and, furthermore, which are electrically insulated from the first internal electrodes with at least one layer of the ceramic layer therebetween, a first external terminal electrode including a first end surface portion, which is disposed on the first end surface so as to be electrically connected to the first internal electrodes, and a first wraparound portion, which is connected to the first end surface portion and which extends onto the first and the second principal surfaces and the first and the second side surfaces, and a second external terminal electrode including a second end surface portion, which is electrically connected to the second internal electrodes and which is disposed on the second end surface, and a second wraparound portion, which is connected to the second end surface portion and which extends to the first and the second principal surfaces and the first and the second side surfaces, and including an outside dimension of about 1.00±0.05 mm×about 0.50±0.05 mm×about 0.50±0.05 mm, wherein the first internal electrode includes a first region extending to the first end surface and a second region, which is connected to the first region and which is disposed inward of the first region in the ceramic element assembly, while the dimension in the width direction of the second region is less than the dimension in the width direction of the first region, and where the first side surface is specified to be a mounting surface, $d_1 > c_1 + 0.15$ g is satisfied, where the distance between a front end of the second wraparound portion and the second end surface is $c_1$, the distance from a first end point, which is closest in the first region to the first side surface and which is closest to the second end surface, to the second end surface is $d_1$, and the distance between the first and the second wraparound portions is g.

In the third preferred embodiment, the second internal electrode preferably includes a third region extending to the second end surface and a fourth region, which is connected to the third region and which is disposed inward the third region in the ceramic element assembly, while the dimension in the width direction of the fourth region is set to be less than the dimension in the width direction of the third region, and $d_2 > c_2 + 0.15$ g is satisfied, where the distance between a front end of the second wraparound portion and the first end surface is $c_2$, and the distance from a second end point, which is closest in the third region to the first side surface and the first end surface, to the first end surface is $d_2$.

The fourth preferred embodiment of the present invention provides a monolithic ceramic electronic component including a ceramic element assembly including a plurality of laminated ceramic layers and including first and second principal surfaces, which extend parallel or substantially parallel to the ceramic layers and which are opposed to each other, first and second side surfaces, which connect the first and the second principal surfaces and which are opposed to each other, and first and second end surfaces, which connect the first and the second principal surfaces and which are opposed to each other, first internal electrodes, which are disposed between the ceramic layers in the ceramic element assembly and which extend to the first end surface, second internal electrodes, which are disposed between the ceramic layers in the ceramic element assembly, which extend to the second end surface, and which are electrically insulated from the first internal electrodes with at least one layer of the ceramic layer therebetween, a first external terminal electrode including a first end surface portion, which is arranged on the first end surface so as to be electrically connected to the first internal electrodes, and a first wraparound portion, which is connected to the first end surface portion and which extends onto the first and the second principal surfaces and the first and the second side surfaces, and a second external terminal electrode including a second end surface portion, which is electrically connected to the second internal electrodes and which is disposed on the second end surface, and a second wraparound portion, which is connected to the second end surface portion and which extends onto the first and the second principal surfaces and the first and the second side surfaces, and including an outside dimension of about 0.60±0.03 mm×about 0.30±0.03 mm×about 0.30±0.03 mm, wherein the first internal electrode includes a first region extending to the first end surface and a second region, which is connected to the first region and which is disposed inward from the first region in the ceramic element assembly, while the dimension in the width direction of the second region is less than the dimension in the width direction of the first region, and where the first side surface is specified to be a mounting surface, $d_1 > c_1 + 0.20$ g is satisfied, where the distance between a front end of the second wraparound portion and the second end surface is $c_1$, the distance from a first end point, which is closest in the first region to the first side surface and which is closest to the second end surface, to the second end surface is $d_1$, and the distance between the first and the second wraparound portions is g.

In the fourth preferred embodiment, the second internal electrode preferably includes a third region extending to the second end surface and a fourth region, which is connected to the third region and which is disposed inward from the third region in the ceramic element assembly, while the dimension in the width direction of the fourth region is preferably set to be less than the dimension in the width direction of the third region, and $d_2 > c_2 + 0.20$ g is satisfied, where the distance between a front end of the second wraparound portion and the first end surface is $c_2$, and the distance from a second end point, which is closest in the third region to the first side surface and the first end surface, to the first end surface is $d_2$.

The fifth preferred embodiment of the present invention provides a monolithic ceramic electronic component including a ceramic element assembly including a plurality of laminated ceramic layers and including first and second principal surfaces, which extend parallel or substantially parallel to the ceramic layers and which are opposed to each other, first and second side surfaces, which connect the first and the second principal surfaces and which are opposed to each other, and first and second end surfaces, which connect the first and the second principal surfaces and which are opposed to each other, first internal electrodes, which are disposed between the ceramic layers in the ceramic element assembly and which extend to the first end surface, second internal electrodes, which are disposed between the ceramic layers in the ceramic element assembly, which extend to the second end surface, and which are electrically insulated from the first internal electrodes with at least one layer of the ceramic layer therebetween, a first external terminal electrode including a first end surface portion, which is disposed on the first end surface so as to be electrically connected to the first internal electrodes, and a first wraparound portion, which is connected to the first end surface portion and which extends onto the first and the second principal surfaces and the first and the second side surfaces, and a second external terminal electrode including a second end surface portion, which is electrically connected to the second internal electrodes and which is disposed on the second end surface, and a second wraparound portion, which is connected to the second end surface portion and which extends onto the first and the second principal surfaces and the first and the second side surfaces, and having an outside dimension of about 0.40±0.02 mm×about 0.20±0.02 mm×about 0.20±0.02 mm, wherein the first internal electrode includes a first region extending to the first end surface and a second region, which is connected to the first region and which is disposed inward from the first region in the ceramic element assembly, while the dimension in the width direction of the second region is less than the dimension in the width direction of the first region, and where the first side surface is specified to be a mounting surface, $d_1 > c_1 + 0.25$ g is satisfied, where the distance between a front end of the second wraparound portion and the second end surface is $c_1$, the distance from a first end point, which is closest in the first region to the first side surface and which is closest to the second end surface, to the second end surface is $d_1$, and the distance between the first and the second wraparound portions is g.

In the fifth preferred embodiment, the second internal electrode preferably includes a third region extending to the second end surface and a fourth region, which is connected to the third region and which is disposed inward from the third region in the ceramic element assembly, while the dimension in the width direction of the fourth region is preferably set to be less than the dimension in the width direction of the third region, and $d_2 > c_2 + 0.25$ g is satisfied, where the distance between a front end of the second wraparound portion and the first end surface is $c_2$, and the distance from a second end point, which is closest in the third region to the first side surface and the first end surface, to the first end surface is $d_2$.

In the first to fifth preferred embodiments of the present invention, the shapes of the first and the second regions defining the internal electrode are not specifically limited. However, it is preferable that the first region and the second region have a substantially rectangular shape, for example. In this case, the first and the second regions having a substantially rectangular shape can be easily formed with high precision by screen printing or other suitable method, for example. In addition, it is more preferable that $b_1 \geq a/4$ is satisfied, where the thickness of a ceramic layer sandwiched between the first internal electrode and the second internal electrode is a and the distance between a point, which is closest in the second region to the first side surface and which is in contact with the first region, and the first end point is $b_1$. Consequently, migration of a metal filler in the electrically conductive adhesive can be more effectively prevented.

Preferably, in the second internal electrode, the third region and the fourth region have a substantially rectangular shape, for example, although the shape is not specifically limited thereto. In this case, the third and the fourth regions can be easily formed with high precision by screen printing or other suitable method, for example. It is more preferable that $b_2 \geq a/4$ is satisfied, where the thickness of a ceramic layer between the first and the second internal electrodes is a and the distance between a point, which is closest in the fourth region to the first side surface and which is in contact with the third region, and the second end point is $b_2$. Consequently, migration of a metal filler in the electrically conductive adhesive can be more effectively prevented.

Furthermore, a third internal electrode, which is disposed between the first internal electrode closest to the first or the second principal surface and the first or the second principal surface so as to overlap at least a portion of the second region of the first internal electrode with a ceramic layer therebetween and to extend to the second end surface, is preferably further included. In this case, since the third internal electrode is disposed between the second region of the first internal electrode and the second external terminal electrode, migration can be more effectively prevented.

Preferably, a fourth internal electrode, which is disposed between the second internal electrode closest to the first or the second principal surface and the first or the second principal surface so as to overlap at least a portion of the fourth region of the second internal electrode with a ceramic layer therebetween and to extend to the first end surface, is further included. In this case, since the fourth internal electrode is disposed between the fourth region of the second internal electrode and the first external terminal electrode, migration can be more effectively prevented.

A mounting structure of a monolithic ceramic electronic component according to another preferred embodiment of the present invention includes a monolithic ceramic electronic component including a ceramic element assembly including a plurality of laminated ceramic layers and including first and second principal surfaces, which extend parallel or substantially parallel to the ceramic layers and which are opposed to each other, first and second side surfaces, which connect the first and the second principal surfaces and which are opposed to each other, and first and second end surfaces, which connect the first and the second principal surfaces and which are opposed to each other, first internal electrodes, which are disposed between the ceramic layers in the ceramic element assembly and which extend to the first end surface, second internal electrodes, which are disposed between the ceramic layers in the ceramic element assembly, which extend to the second end surface, and which are electrically insulated from the first internal electrodes with at least one layer of the ceramic layer therebetween, a first external terminal electrode including a first end surface portion, which is disposed on the first end surface so as to be electrically connected to the first internal electrodes, and a first wraparound portion, which is connected to the first end surface portion and which extends onto the first and the second principal surfaces and the first and the second side surfaces, and a second external terminal electrode including a second end surface portion, which is electrically connected to the second internal electrodes and which is disposed on the second end surface, and a second wraparound portion, which is connected to the second end surface portion and which extends onto the first and the second principal surfaces and the first and the second side surfaces, a mounting substrate including first and second lands electrically connected to the first and the second external terminal electrodes, respectively, and first and second electrically conductive adhesives, which connect the first and the second external terminal electrodes to the first and the second lands of the mounting substrate, the monolithic ceramic electronic component being mounted on the mounting substrate while the first side surface defines a mounting surface, wherein the second electrically conductive adhesive disposed at least on the second land extends around from the second external terminal electrode to the first side surface of the ceramic element assembly so as to come into contact with the first side surface, and an end point, which is located at a position closest in the first region of the first internal electrode to the first side surface and closest to the second end surface, does not overlap the second electrically conductive adhesive in the height direction of the monolithic ceramic electronic component in the mounting structure.

The monolithic ceramic electronic component according to the first preferred embodiment of the present invention preferably has an outside dimension of about 2.00±0.10 mm×about 1.25±0.10 mm×about 1.25±0.10 mm, the first internal electrode includes the first and the second regions, and $d_1 > c_1 + 0.07$ g is satisfied. Therefore, when mounting on the substrate is performed using the electrically conductive adhesive, even when the second electrically conductive adhesive is squeezed downward from the second external terminal electrode to the first external terminal electrode side, the portion of squeezing of the electrically conductive adhesive is located under the second region of the first internal electrode and is not located under the first region. Consequently, the field strength between the first internal electrode and the second electrically conductive adhesive is reduced, and migration of the metal in the second electrically conductive adhesive does not readily occur. Thus, deterioration of the characteristics due to migration of the metal filler in the electrically conductive adhesive does not readily occur. As a result, when the monolithic ceramic electronic component itself has good characteristics, deterioration of the characteristics does not readily occur after mounting is performed using the electrically conductive adhesive.

The monolithic ceramic electronic component according to the second preferred embodiment of the present invention has an outside dimension of about 1.60±0.10 mm×about 0.80±0.10 mm×about 0.80±0.10 mm, the first internal electrode includes the first and the second regions, and $d_1 > c_1 + 0.10$ g is satisfied. Therefore, when mounting on the substrate is performed using the electrically conductive adhesive, even when the second electrically conductive adhesive is squeezed downward from the second external terminal electrode to the first external terminal electrode side, the portion of squeezing of the electrically conductive adhesive is located under the second region of the first internal electrode and is not located under the first region. Consequently, the field strength between the first internal electrode and the electrically conductive adhesive is reduced, and migration of the metal in the electrically conductive adhesive does not readily occur. Thus, deterioration of the characteristics due to migration of the metal filler in the electrically conductive adhesive does not readily occur. As a result, when the monolithic ceramic electronic component itself has good characteristics, deterioration of the characteristics does not readily occur after mounting is performed using the electrically conductive adhesive.

The monolithic ceramic electronic component according to the third preferred embodiment of the present invention has an outside dimension of about 1.00±0.05 mm×about 0.50±0.05 mm×about 0.50±0.05 mm, the first internal electrode includes the first and the second regions, and $d_1 > c_1 + 0.15$ g is satisfied. Therefore, when mounting on the substrate is performed using the electrically conductive adhesive, even when the second electrically conductive adhesive is squeezed downward from the second external terminal electrode to the first external terminal electrode side, the portion of squeezing of the electrically conductive adhesive is located under the second region of the first internal electrode and is not located under the first region. Consequently, the field strength between the first internal electrode and the electrically conductive adhesive is reduced, and migration of the metal in the electrically conductive adhesive does not readily occur. Thus, deterioration of the characteristics due to migration of the metal filler in the electrically conductive adhesive does not readily occur. As a result, when the monolithic ceramic electronic component itself has good characteristics, deterioration of the characteristics does not readily occur after mounting is performed using the electrically conductive adhesive.

The monolithic ceramic electronic component according to the fourth preferred embodiment of the present invention has an outside dimension of about 0.60±0.03 mm×about 0.30±0.03 mm×about 0.30±0.03 mm, the first internal electrode includes the first and the second regions, and $d_1 > c_1 + 0.20$ g is satisfied. Therefore, when mounting on the substrate is performed using the electrically conductive adhesive, even when the second electrically conductive adhesive is squeezed downward from the second external terminal electrode to the first external terminal electrode side, the portion of squeezing of the electrically conductive adhesive is located under the second region of the first internal electrode and is not located under the first region. Consequently, the field strength between the first internal electrode and the electrically conductive adhesive is reduced, and migration of the metal in the electrically conductive adhesive does not readily occur. Thus, deterioration of the characteristics due to migration of the metal filler in the electrically conductive adhesive does not readily occur. As a result, when the monolithic ceramic electronic component itself has good characteristics, deterioration of the characteristics does not occur easily after mounting is performed using the electrically conductive adhesive.

The monolithic ceramic electronic component according to the fifth preferred embodiment of the present invention has an outside dimension of about 0.40±0.02 mm×about 0.20±0.02 mm×about 0.20±0.02 mm, the first internal electrode has the first and the second regions, and $d_1 > c_1 + 0.25$ g is satisfied. Therefore, when mounting on the substrate is performed using the electrically conductive adhesive, even when the second electrically conductive adhesive is squeezed downward from the second external terminal electrode to the first external terminal electrode side, the portion of squeezing of the electrically conductive adhesive is located under the second region of the first internal electrode and is not located under the first region. Consequently, the field strength between the first internal electrode and the electrically conductive adhesive is reduced, and migration of the metal in the electrically conductive adhesive does not readily occur. Thus, deterioration of the characteristics due to migration of the metal filler in the electrically conductive adhesive does not readily occur. As a result, when the monolithic ceramic electronic component itself has good characteristics, deterioration of the characteristics does not occur easily after mounting is conducted through the use of the electrically conductive adhesive.

In the mounting structure of the monolithic ceramic electronic component according to various preferred embodiments of the present invention, mounting is performed on the mounting substrate from the side of the first side surface of the ceramic element assembly using the electrically conductive adhesive such that the directions of the first and the second internal electrodes become perpendicular or substantially perpendicular to the mounting substrate. Therefore, the second electrically conductive adhesive connecting the second external terminal electrode and the second land does not extend under the end point, which is closest to the first side surface and which is closest to the second end surface, in the first region of the first internal electrode. Consequently, the field strength between the second electrically conductive adhesive and the first internal electrode can be reduced. Thus, migration due to a metal filler in the electrically conductive adhesive can be effectively prevented. As a result, the electrical characteristics of a monolithic ceramic electronic component does not readily deteriorate after mounting is performed using the electrically conductive adhesive. Then, the mounting structure of a monolithic ceramic electronic component exhibiting excellent reliability and having stable characteristics can be provided.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

The specific preferred embodiments according to the present invention will be described below with reference to drawings.

Figure 1A:
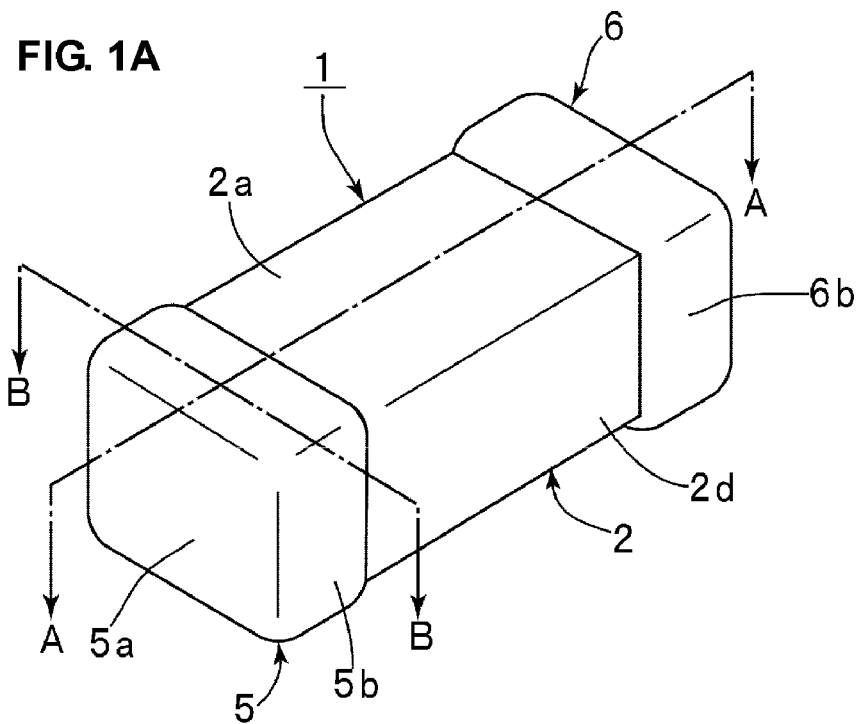
FIG. 1A is a perspective view of a monolithic ceramic electronic component according to a first preferred embodiment of the present invention.
Figure 1B:
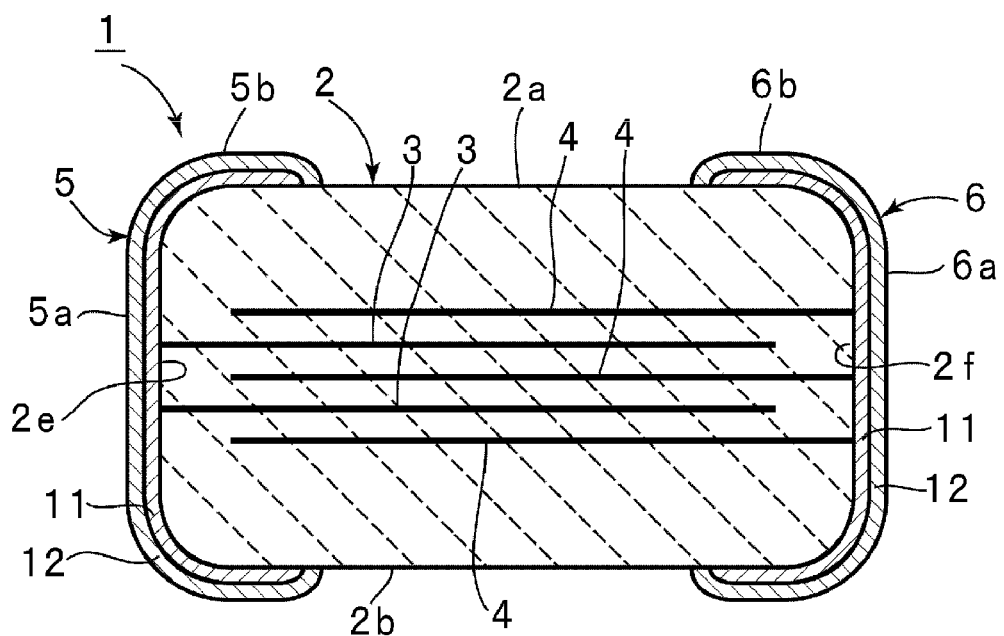
FIG. 1B is a sectional view of the section taken along a line A-A shown in FIG. 1A.

FIG. 1A is a perspective view of a monolithic ceramic electronic component according to a first preferred embodiment of the present invention, and FIG. 1B is a sectional front view of the section taken along a line A-A shown in FIG. 1A.

A monolithic ceramic electronic component 1 according to the present preferred embodiment is a monolithic ceramic capacitor, for example.

The ceramic electronic component 1 includes a ceramic element assembly 2 formed by laminating a plurality of ceramic layers. The ceramic material defining the ceramic element assembly 2 is not specifically limited, and an appropriate dielectric ceramic can be used. In the present preferred embodiment, $BaTiO_3$ based ceramic is preferably used, for example.

The ceramic element assembly 2 has first and second principal surfaces 2a and 2b, which preferably have a substantially rectangular shape, for example, which extend parallel or substantially parallel to the ceramic layers, and which are opposed to each other, first and second side surfaces 2c and 2d, which connect the first and the second principal surfaces 2a and 2b and which are opposed to each other, and first and second end surfaces 2e and 2f, which connect the first and the second principal surfaces and which are opposed to each other. In the present preferred embodiment, the monolithic ceramic electronic component 1 preferably has an outside dimension of, for example, about 2.00±0.10 mm×about 1.25±0.10 mm×about 1.25±0.10 mm and, therefore, is a 2012 sized monolithic ceramic capacitor.

In the ceramic element assembly 2, a plurality of first internal electrodes 3 and a plurality of second internal electrodes 4 are provided. However, one internal electrode 3 and one internal electrode 4 may be provided.

The first internal electrodes 3 are disposed between the ceramic layers and extend to the first end surface 2e of the ceramic element assembly 2. The second internal electrodes 4 are disposed between the ceramic layers and extend to the second end surface 2f. The second internal electrodes 4 are electrically insulated from the first internal electrodes 3 with at least one layer of the ceramic layer therebetween. A capacitance is provided at a portion in which the first internal electrode 3 and the second internal electrode 4 are opposed to one another with the ceramic layer therebetween.

The first and the second internal electrodes 3 and 4 are made of an appropriate electrically conductive material. In the present preferred embodiment, a Ni paste, for example, is preferably fired at the same time as firing of the ceramic element assembly 2 and, thereby, the internal electrodes 3 and 4 are formed.

Figure 2:
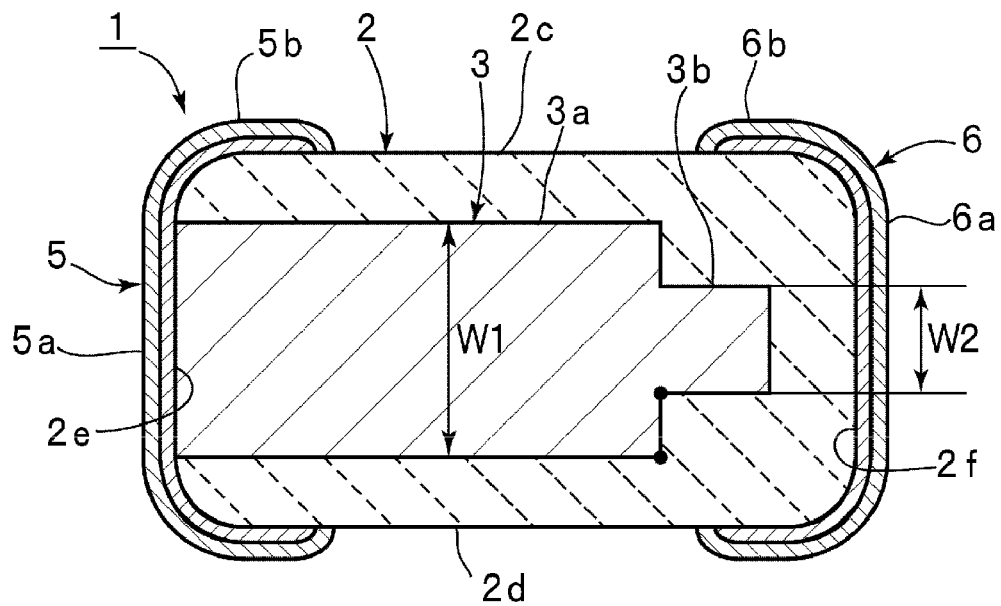
FIG. 2 is a sectional plan view of the monolithic ceramic electronic component in the first preferred embodiment of the present invention.

As shown in the sectional plan view shown in FIG. 2, the first internal electrode 3 includes a first region 3a extending to the first end surface 2e and a second region 3b, which is connected to the first region 3a and which is located in the front end side of the internal electrode 3. Although not specifically limited, the first region 3a preferably has a substantially rectangular shape, for example, and the second region 3b also preferably has a substantially rectangular shape, for example. When the regions 3a and 3b have a substantially rectangular shape, the first and the second regions 3a and 3b can be easily formed with high precision by a screen printing method or other suitable method, for example.

The dimension W2 in the width direction of the second region 3b is less than the dimension W1 in the width direction of the first region 3a. The dimension in the width direction refers to an internal electrode dimension in the direction perpendicular or substantially perpendicular to the direction in which the internal electrode 3 extends, that is, the internal electrode dimension in the direction perpendicular or substantially perpendicular to the direction, in which the internal electrode 3 extends from the first end surface 2e to the front end of the second region 3b.

Figure 3:
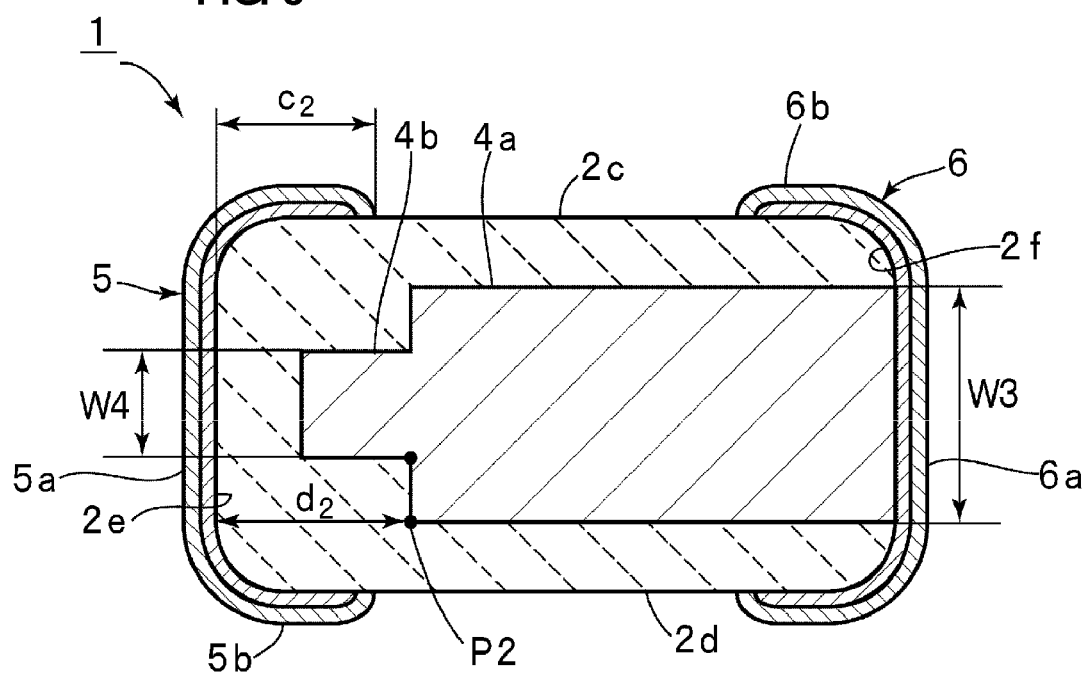
FIG. 3 is a sectional plan view at a height position different from that of FIG. 2 of the monolithic ceramic electronic component in the first preferred embodiment of the present invention.

In the present preferred embodiment, as shown in the sectional plan view shown in FIG. 3, the second internal electrode 4 includes third and fourth regions 4a and 4b preferably having a substantially rectangular shape, for example. The third region 4a extends to the second end surface 2f and the fourth region 4b is connected to the third region 4a and is located in the front end side of the second internal electrode 4. The dimension W4 in the width direction of the fourth region 4b is less than the dimension W3 in the width direction of the third region 4a.

In the present preferred embodiment, the first and the second internal electrodes 3 and 4 are preferably configured to have the same or substantially the same shape and, therefore, W1=W3 and W2=W4 is satisfied. However, W1 and W3 are not necessarily equal, and W2 and W4 are not necessarily equal.

Nevertheless, it is preferable that the shape of the internal electrode 3 and the shape of the internal electrode 4 are the same or substantially the same, as described above. In that case, the types of the electrode patterns can be reduced, and the production process can be simplified.

As shown in FIG. 1B, a first external terminal electrode 5 is arranged so as to cover the first end surface 2e, and a second external terminal electrode 6 is arranged so as to cover the second end surface 2f.

Each of the first external terminal electrode 5 and the second external terminal electrode 6 has a structure in which a first electrode layer 11 provided on the ceramic element assembly 2 and preferably made of Cu, for example, and a second electrode layer 12 laminated on the first electrode layer 11 and preferably made of Ag—Pt, for example, are laminated. The first electrode layer 11 is preferably formed by applying and baking a Cu-containing electrically conductive paste. The second electrode layer 12 is preferably formed by providing Ag—Pt through plating or the like. However, the external terminal electrodes 5 and 6 may be formed by methods other than these methods.

When the first electrode layers 11 of the external terminal electrodes 5 and 6 are formed by baking of the electrically conductive paste, the first electrode layers 11 may preferably be baked at the same time with a firing step in formation of the ceramic element assembly 2 or may preferably be formed through the application and baking of the electrically conductive paste after the firing step to obtain the ceramic element assembly 2 is completed.

At least one plating layer may preferably be further disposed on outside surfaces of the external terminal electrodes 5 and 6.

Moreover, resin layers provided to relax stresses may preferably be disposed in the external terminal electrodes 5 and or between the external terminal electrodes 5 and 6 and the plating layers.

The first external terminal electrode 5 includes a first end surface portion 5a located on the first end surface 2e and a first wraparound portion 5b connected to the first end surface portion 5a. The first wraparound portion 5b extends onto the first and the second principal surfaces 2a and 2b and the first and the second side surfaces 2c and 2d of the ceramic element assembly 2.

In addition, the second external terminal electrode 6 also includes a second end surface portion 6a and a second wraparound portion 6b. The second end surface portion 6a is arranged so as to cover the second end surface 2f, and the second wraparound portion 6b is arranged on the first and the second principal surfaces 2a and 2b and the first and the second side surfaces 2c and 2d on the ceramic element assembly 2.

The ceramic element assembly 2 is rounded at corner portions, and likewise, ridge portions defined by the first and the second principal surfaces 2a and 2b and the first and the second side surfaces 2c and 2d, ridge portions defined by the first and the second end surfaces 2e and 2f and the first and the second principal surfaces 2a and 2b, and ridge portions defined by the first and the second end surfaces 2e and 2f and the first and the second side surfaces 2c and 2d are rounded.

Figure 4:
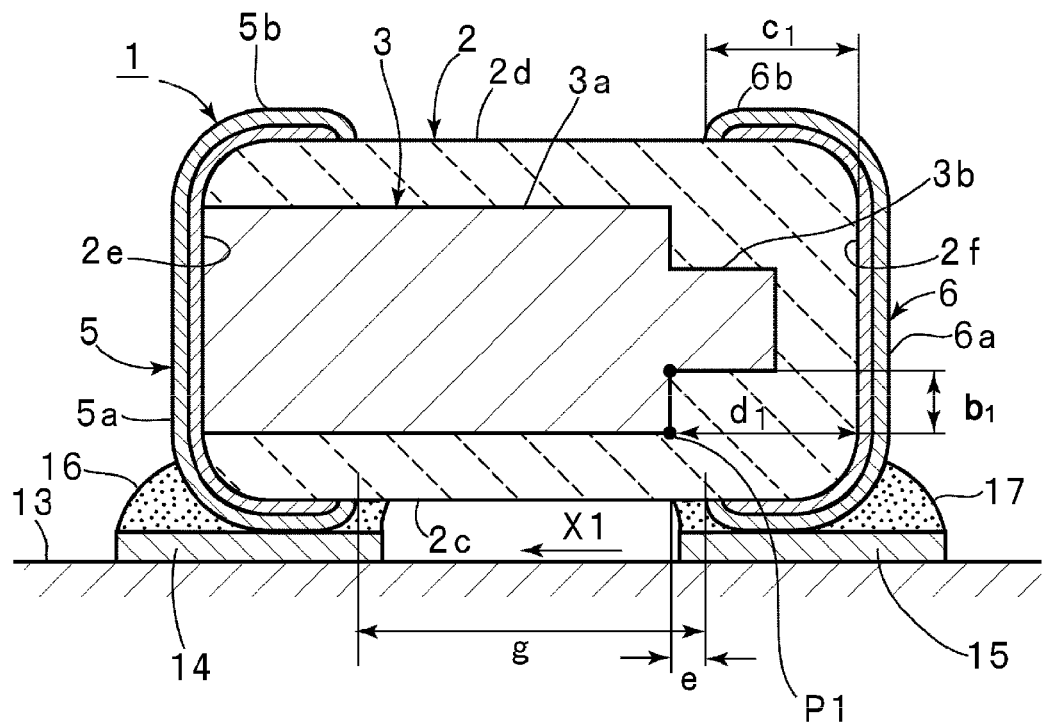
FIG. 4 is a partially cut-out sectional front view schematically showing a mounting structure formed by mounting the monolithic ceramic electronic component in the first preferred embodiment of the present invention on a mounting substrate.
Figure 5:
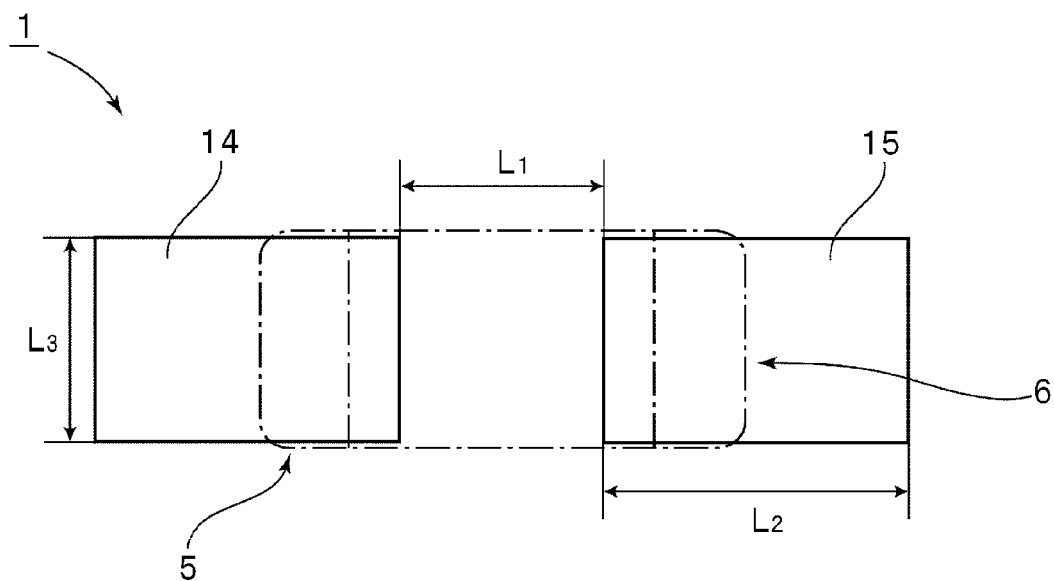
FIG. 5 is a plan view showing the configuration of first and second lands 14 and 15 of a mounting structure in the first preferred embodiment of the present invention.

The features of the monolithic ceramic electronic component 1 will be described with reference to the mounting structure shown in FIG. 4. In FIG. 4, the monolithic ceramic electronic component 1 is mounted on a mounting substrate 13 while the first side surface 2c of the ceramic element assembly 2 of the monolithic ceramic electronic component 1 defines a mounting surface. First and second lands 14 and 15 arranged with a predetermined distance therebetween are disposed on the mounting substrate 13. The first land 14 and the second land 15 are arranged to join and electrically connect the monolithic ceramic electronic component 1 to first and second electrically conductive adhesives 16 and 17. The first and the second lands 14 and 15 are preferably made of Cu or an appropriate metal or alloy, for example. Generally, the first and the second lands 14 and 15 having dimensions $L_1$, $L_2$, and $L_3$ (mm), as shown in FIG. 5, of $0 \leq L_1 \leq 1.2$, $0.6 \leq L_2 \leq 0.7$, and $0.8 \leq L_3 \leq 1.1$, respectively, for example, are preferably used. In the present preferred embodiment, lands having $L_1=1.10$ mm, $L_2=0.65$ mm, and $L_3=1.00$ mm, for example, are preferably used.

As shown in FIG. 4, the monolithic ceramic electronic component 1 is mounted such that the first side surface 2c of the ceramic element assembly 2 faces the mounting substrate 13. Here, the first external terminal electrode 5 is connected to the first land 14 with the first electrically conductive adhesive 16. On the other hand, the second external terminal electrode 6 is connected to the second land 15 with the electrically conductive adhesive 17.

The electrically conductive adhesives 16 and 17 preferably have a composition in which a metal filler of Ag, for example, is blended into a thermosetting resin, e.g., an epoxy resin. With the electrically conductive adhesives 16 and 17, the monolithic ceramic electronic component 1 is disposed on the first and the second lands 14 and 15 with uncured electrically conductive adhesives 16 and 17 having fluidity therebetween, and the electrically conductive adhesives 16 and 17 are cured through heating.

The electrically conductive adhesives 16 and 17 have fluidity before curing and, therefore, are pushed by the monolithic ceramic electronic component 1 before curing, so as to tend to move laterally. Consequently, for example, the electrically conductive adhesive 17 is squeezed out in the direction indicated by an arrow X1 shown in FIG. 4, that is, to the side of the first external terminal electrode 5. In other words, the electrically conductive adhesive 17 tends to extend to the side of the first external terminal electrode 5 rather than the top end of the second wraparound portion 6b of the external terminal electrode 6. During mounting, it is sufficient that the second external terminal electrode 6 is connected to the second land 15 with the electrically conductive adhesive 17. It is not preferable that the electrically conductive adhesive 17 crosses the second wraparound portion 6b of the second external terminal electrode 6 and extends to the side surface 2c of the ceramic element assembly 2. However, in practice, the uncured electrically conductive adhesive 17 has fluidity and, thereby, is squeezed out in the direction indicated by the arrow X1, as described above. As a result, as indicated by a squeeze-out dimension e shown in FIG. 4, the electrically conductive adhesive 17 is squeezed out in the direction indicated by the arrow X1 and comes into contact with the side surface 2c of the ceramic element assembly 2.

The first internal electrode 3 is preferably configured to have the dimension W2 in the width direction of the second region 3b that is less than the dimension W1 in the width direction of the first region 3a and, thereby, the field strength between the electrically conductive adhesive 17 and the internal electrode 3 is reduced. Thus, deterioration of the characteristics due to migration of Ag ions in the electrically conductive adhesive 17 is effectively prevented.

In the present preferred embodiment, $d_1 > c_1 + 0.07$ g is preferably satisfied, where the distance between the front end of the second wraparound portion 6b and the second end surface 2f is $c_1$, the distance from a first end point P1, which is closest in the first region 3a to the first side surface 2c and which is closest to the second end surface 2f, to the second end surface 2f is $d_1$, and the distance between the first and the second wraparound portions 5b and 6b is g. Thus, deterioration of the characteristics due to migration of Ag ions can be effectively prevented.

In the present preferred embodiment, the distance $d_1$ from the end point P1 to the second end surface 2f is set to be greater than the distance $c_1$ between the front end of the second wraparound portion 6b and the second end surface 2f. Therefore, the end point P1 does not overlap the electrically conductive adhesive 17 in the height direction of the mounted monolithic ceramic electronic component 1. That is, the electrically conductive adhesive 17 is not present under the first region 3a. On the other hand, the dimension W2 in the width direction of the second region 3b is set to be less than the dimension W1 in the width direction of the first region 3a. Therefore, the distance from the side surface 2c of the ceramic element assembly 2 to the second region 3b is preferably set to be greater than the distance from the side surface 2c to the first region 3a by a distance b. Consequently, the field strength between the second region 3b and the electrically conductive adhesive 17 is reduced and migration of Ag ions is prevented. In this connection, $2b = W1 - W2$ is satisfied.

However, the electrically conductive adhesive 17 has fluidity in an uncured state and, therefore, is squeezed out by a squeeze-out dimension e in the X1 direction. Consequently, in order to prevent migration of Ag ions into the ceramic element assembly 2 due to this squeeze-out portion, it is necessary that the distance $d_1$ is not only greater than the distance $c_1$, but is greater to an extent that takes into consideration the squeeze-out portion. Thus, in the present preferred embodiment, the distance $d_1$ is preferably set to exceed the distance $c_1 + 0.07$ g, for example. The value 0.07 g corresponds to a maximum value of the squeeze-out dimension e of the electrically conductive adhesion, which will be described later.

In the present preferred embodiment, the side of the external electrode 4 preferably includes the same or substantially the same configuration as that of the side of the first internal electrode 3. That is, as shown in FIG. 3, $d_2 > c_2 + 0.07$ g is satisfied, where the distance between a front end of the first wraparound portion 5b of the first external terminal electrode 5 and the first end surface 2e is $c_2$, and the distance from a second end point P2, which is closest in the third region 4a in the second internal electrode 4 to the first side surface 2c and the first end surface 2e, to the first end surface 2e is $d_2$. Therefore, even when the first electrically conductive adhesive 16 is squeezed out by a dimension e to the side of the second external terminal electrode 6, deterioration of the characteristics due to migration of Ag ions resulting from the electrically conductive adhesive 16 is effectively prevented.

However, it is not necessary that $d_2 > c_2 + 0.07$ g is satisfied, as long as only $d_1 > c_1 + 0.07$ g is satisfied. This is described with reference to specific experiments that migration can be reliably prevented by satisfying $d_1 > c_1 + 0.07$ g in the present preferred embodiment.

Large numbers of monolithic ceramic electronic components 1 were produced using ceramic element assemblies 2, wherein a total of 250 layers of first and second internal electrodes 3 and 4 having first and second regions 3a and 3b and third and forth regions 4a and 4b were laminated in the ceramic element assembly 2, which had an outside dimension of about 2.00 mm×about 1.25 mm×about 1.25 mm and which was formed from $BaTiO_3$ based ceramic. Here, in the monolithic ceramic electronic component 1, the distances $c_1$ and $c_2$ between front ends of the first and the second wraparound portions 5b and 6b of the first and the second external terminal electrodes 5 and 6 and the first and the second end surfaces 2e and 2f were set to be about 0.50 mm, for example.

The monolithic ceramic electronic component 1 was mounted on the mounting substrate 13, which was provided with the first and the second lands 14 and 15 formed preferably from Ag, for example, on the upper surface and which was formed from alumina, by using the electrically conductive adhesives 16 and 17. For the electrically conductive adhesives 16 and 17, an electrically conductive adhesive, in which an Ag powder was included in an epoxy resin at a proportion of about 60%, for example, was preferably used. The uncured electrically conductive adhesives 16 and 17 were applied to the first and the second lands 14 and 15 and cured through heating at a temperature of about 140° C. for about 30 minutes, for example, after the monolithic ceramic electronic component 1 was mounted. In this manner, a mounting structure of the monolithic ceramic electronic component 1 was obtained. Thirty samples of the mounting structure of this monolithic ceramic electronic component 1 were prepared.

Regarding the thirty samples of this mounting structure, each of the squeeze-out dimensions e of the electrically conductive adhesives 16 and 17 under the monolithic ceramic electronic component 1 and the distances g between the first and the second wraparound portions 5b and 6b was measured, and the relationship between e and g was examined. The results thereof are shown in Table 1.

TABLE 1

| | 2012 Size | | |
|---|---|---|---|
| Sample | g (mm) | e (mm) | e/g |
| 1 | 1.40 | 0.09 | 0.06 |
| 2 | 1.38 | 0.08 | 0.06 |
| 3 | 1.39 | 0.03 | 0.02 |
| 4 | 1.21 | 0.08 | 0.07 |
| 5 | 1.45 | 0.09 | 0.06 |
| 6 | 1.42 | 0.04 | 0.03 |
| 7 | 1.43 | 0.04 | 0.03 |
| 8 | 1.36 | 0.09 | 0.07 |
| 9 | 1.43 | 0.08 | 0.06 |
| 10 | 1.46 | 0.07 | 0.05 |
| 11 | 1.35 | 0.08 | 0.06 |
| 12 | 1.00 | 0.03 | 0.03 |
| 13 | 1.24 | 0.04 | 0.03 |
| 14 | 1.41 | 0.05 | 0.04 |
| 15 | 1.40 | 0.09 | 0.06 |
| 16 | 1.39 | 0.02 | 0.01 |

TABLE 1-continued

| | 2012 Size | | |
|---|---|---|---|
| Sample | g (mm) | e (mm) | e/g |
| 17 | 1.40 | 0.08 | 0.06 |
| 18 | 1.38 | 0.09 | 0.07 |
| 19 | 1.42 | 0.10 | 0.07 |
| 20 | 1.45 | 0.02 | 0.01 |
| 21 | 1.47 | 0.04 | 0.03 |
| 22 | 1.34 | 0.05 | 0.04 |
| 23 | 1.33 | 0.09 | 0.07 |
| 24 | 1.45 | 0.03 | 0.02 |
| 25 | 1.47 | 0.08 | 0.05 |
| 26 | 1.48 | 0.09 | 0.06 |
| 27 | 1.43 | 0.04 | 0.03 |
| 28 | 1.44 | 0.06 | 0.04 |
| 29 | 1.42 | 0.07 | 0.05 |
| 30 | 1.40 | 0.03 | 0.02 |
| Average | 1.39 | 0.06 | 0.04 |
| Maximum | 1.48 | 0.10 | 0.07 |
| Minimum | 1.00 | 0.02 | 0.01 |

As shown in Table 1, the maximum value of e/g was about 0.07, for example. Therefore, when $d_1 > c_1 + 0.07$ g is satisfied, even when the electrically conductive adhesive is squeezed out, for example, in the direction indicated by the arrow X1, the electrically conductive adhesive 17 is always located under the second region 3b having a relatively small width and is not located under the first region 3a. Consequently, the field strength between the electrically conductive adhesive 17 and the first internal electrode 3 can be reduced, and deterioration of the characteristics due to migration of Ag ions can be reliably prevented.

Next, with respect to second to fifth preferred embodiments of the present invention, monolithic ceramic electronic components having the same configuration were prepared except that the dimension of the ceramic element assembly 2 was specified to be about 1.6×about 0.8 mm×about 0.8 mm, about 1.0 mm×about 0.5 mm×about 0.5 mm, about 0.6 mm×about 0.3 mm×about 0.3 mm, or about 0.4 mm×about 0.2 mm×about 0.2 mm. That is, thirty samples of the mounting structure of each of 1608 sized, 1005 sized, 0603 sized, and 0402 sized monolithic ceramic electronic components 1 were prepared. Each of the squeeze-out dimension e of the electrically conductive adhesive and the distance g between the first and the second wraparound portions 5b and 6b were measured as described above, and the relationship between e and g was examined. The results thereof are shown in Table 2. The individual values of dimensions of $L_1$, $L_2$, and $L_3$ shown in FIG. 5 of the first and the second lands 14 and 15 are shown in Table 3.

TABLE 2

| | 1608 Size | | | 1005 Size | | | 0603 Size | | | 0402 Size | | |
|---|---|---|---|---|---|---|---|---|---|---|---|---|
| Sample | g (mm) | e (mm) | e/g | g (mm) | e (mm) | e/g | g (mm) | e (mm) | e/g | g (mm) | e (mm) | e/g |
| 1 | 0.75 | 0.04 | 0.05 | 0.48 | 0.02 | 0.04 | 0.31 | 0.01 | 0.03 | 0.15 | 0.03 | 0.20 |
| 2 | 0.81 | 0.08 | 0.10 | 0.55 | 0.04 | 0.07 | 0.32 | 0.04 | 0.13 | 0.18 | 0.04 | 0.22 |
| 3 | 0.84 | 0.07 | 0.08 | 0.56 | 0.03 | 0.05 | 0.34 | 0.03 | 0.09 | 0.17 | 0.04 | 0.24 |
| 4 | 0.78 | 0.05 | 0.06 | 0.54 | 0.02 | 0.04 | 0.35 | 0.05 | 0.14 | 0.17 | 0.02 | 0.12 |
| 5 | 0.79 | 0.04 | 0.05 | 0.53 | 0.06 | 0.11 | 0.32 | 0.06 | 0.19 | 0.18 | 0.01 | 0.06 |
| 6 | 0.82 | 0.03 | 0.04 | 0.59 | 0.03 | 0.05 | 0.35 | 0.03 | 0.09 | 0.19 | 0.03 | 0.16 |
| 7 | 0.80 | 0.05 | 0.06 | 0.54 | 0.07 | 0.13 | 0.36 | 0.07 | 0.19 | 0.20 | 0.04 | 0.20 |
| 8 | 0.79 | 0.05 | 0.06 | 0.55 | 0.02 | 0.04 | 0.32 | 0.03 | 0.09 | 0.15 | 0.03 | 0.20 |
| 9 | 0.77 | 0.06 | 0.08 | 0.58 | 0.08 | 0.14 | 0.34 | 0.06 | 0.18 | 0.17 | 0.02 | 0.12 |
| 10 | 0.83 | 0.08 | 0.10 | 0.54 | 0.03 | 0.06 | 0.32 | 0.03 | 0.09 | 0.18 | 0.03 | 0.17 |
| 11 | 0.84 | 0.08 | 0.10 | 0.56 | 0.05 | 0.09 | 0.34 | 0.04 | 0.12 | 0.17 | 0.04 | 0.24 |
| 12 | 0.84 | 0.05 | 0.06 | 0.59 | 0.07 | 0.12 | 0.33 | 0.06 | 0.18 | 0.19 | 0.02 | 0.11 |
| 13 | 0.78 | 0.04 | 0.05 | 0.58 | 0.08 | 0.14 | 0.33 | 0.02 | 0.06 | 0.20 | 0.02 | 0.10 |
| 14 | 0.82 | 0.05 | 0.06 | 0.54 | 0.08 | 0.15 | 0.32 | 0.04 | 0.13 | 0.16 | 0.04 | 0.25 |
| 15 | 0.79 | 0.05 | 0.06 | 0.55 | 0.03 | 0.05 | 0.34 | 0.05 | 0.15 | 0.18 | 0.01 | 0.06 |

TABLE 2-continued

| Sample | 1608 Size | | | 1005 Size | | | 0603 Size | | | 0402 Size | | |
|---|---|---|---|---|---|---|---|---|---|---|---|---|
| | g (mm) | e (mm) | e/g | g (mm) | e (mm) | e/g | g (mm) | e (mm) | e/g | g (mm) | e (mm) | e/g |
| 16 | 0.82 | 0.08 | 0.10 | 0.56 | 0.05 | 0.09 | 0.35 | 0.03 | 0.09 | 0.16 | 0.02 | 0.13 |
| 17 | 0.76 | 0.07 | 0.09 | 0.53 | 0.06 | 0.11 | 0.33 | 0.04 | 0.12 | 0.17 | 0.04 | 0.24 |
| 18 | 0.77 | 0.02 | 0.03 | 0.57 | 0.04 | 0.07 | 0.37 | 0.02 | 0.05 | 0.20 | 0.03 | 0.15 |
| 19 | 0.83 | 0.01 | 0.01 | 0.55 | 0.07 | 0.13 | 0.38 | 0.05 | 0.13 | 0.17 | 0.02 | 0.12 |
| 20 | 0.81 | 0.05 | 0.06 | 0.44 | 0.05 | 0.11 | 0.33 | 0.06 | 0.18 | 0.18 | 0.04 | 0.22 |
| 21 | 0.80 | 0.05 | 0.06 | 0.56 | 0.04 | 0.07 | 0.33 | 0.05 | 0.15 | 0.20 | 0.04 | 0.20 |
| 22 | 0.79 | 0.06 | 0.08 | 0.59 | 0.08 | 0.14 | 0.34 | 0.03 | 0.09 | 0.21 | 0.02 | 0.10 |
| 23 | 0.82 | 0.04 | 0.05 | 0.55 | 0.02 | 0.04 | 0.33 | 0.06 | 0.18 | 0.18 | 0.04 | 0.22 |
| 24 | 0.76 | 0.07 | 0.09 | 0.53 | 0.04 | 0.08 | 0.38 | 0.04 | 0.11 | 0.17 | 0.03 | 0.18 |
| 25 | 0.79 | 0.03 | 0.04 | 0.57 | 0.05 | 0.09 | 0.39 | 0.06 | 0.15 | 0.19 | 0.03 | 0.16 |
| 26 | 0.78 | 0.04 | 0.05 | 0.55 | 0.06 | 0.11 | 0.33 | 0.06 | 0.18 | 0.17 | 0.04 | 0.24 |
| 27 | 0.77 | 0.03 | 0.04 | 0.54 | 0.06 | 0.11 | 0.35 | 0.07 | 0.20 | 0.18 | 0.04 | 0.22 |
| 28 | 0.80 | 0.06 | 0.08 | 0.58 | 0.07 | 0.12 | 0.38 | 0.04 | 0.11 | 0.19 | 0.02 | 0.11 |
| 29 | 0.81 | 0.04 | 0.05 | 0.55 | 0.04 | 0.07 | 0.34 | 0.03 | 0.09 | 0.16 | 0.01 | 0.06 |
| 30 | 0.82 | 0.07 | 0.09 | 0.59 | 0.08 | 0.14 | 0.32 | 0.06 | 0.19 | 0.20 | 0.03 | 0.15 |
| Average | 0.80 | 0.05 | 0.06 | 0.55 | 0.05 | 0.09 | 0.34 | 0.04 | 0.13 | 0.18 | 0.03 | 0.16 |
| Maximum | 0.84 | 0.08 | 0.10 | 0.59 | 0.08 | 0.15 | 0.39 | 0.07 | 0.20 | 0.21 | 0.04 | 0.25 |
| Minimum | 0.75 | 0.01 | 0.01 | 0.44 | 0.02 | 0.04 | 0.31 | 0.01 | 0.03 | 0.15 | 0.01 | 0.06 |

TABLE 3

| Chip size | $L_1$ (mm) | $L_2$ (mm) | $L_3$ (mm) |
|---|---|---|---|
| Present preferred embodiment | | | |
| 0402 | 0.18 | 0.15 | 0.22 |
| 0603 | 0.25 | 0.27 | 0.30 |
| 1005 | 0.40 | 0.40 | 0.50 |
| 1608 | 0.70 | 0.65 | 0.70 |
| General Design | | | |
| 0402 | 0.16 to 0.20 | 0.12 to 0.18 | 0.20 to 0.23 |
| 0603 | 0.20 to 0.30 | 0.20 to 0.35 | 0.20 to 0.40 |
| 1005 | 0.30 to 0.50 | 0.35 to 0.45 | 0.40 to 0.60 |
| 1608 | 0.60 to 0.80 | 0.60 to 0.70 | 0.60 to 0.80 |

As shown in Table 2, the maximum value of e/g of the 1608 size was about 0.10. Results were about 0.15 for the 1005 size, about 0.20 for the 0603 size, and about 0.25 for the 0402 size.

For the purpose of comparison, each of the squeeze-out dimension e and the distance g between the first and the second wraparound portions 5b and 6b of a 3216 sized monolithic ceramic electronic component having a dimension of about 3.2 mm×about 1.6 mm×about 1.6 mm and a 3225 sized monolithic ceramic electronic component having a dimension of about 3.2 mm×about 2.5 mm×about 2.5 mm were measured, and the relationship between e and g was examined. However, regarding the 3216 size and the 3225 size, squeezing out of the electrically conductive adhesive to the center side of the ceramic element assembly was not observed. Therefore, it is clear that with respect to the 3216 size and the 3225 size, a migration problem does not occur easily even when the squeeze-out dimensions e is not taken into consideration.

Furthermore, as is clear from the results, the proportion of the squeeze-out dimension e relative to the distance g between the first and the second wraparound portions 5b and 6b increases as the size of the monolithic ceramic electronic component decreases. The reason for this is believed to be that the phenomenon, in which the electrically conductive adhesive is squeezed out, for example, in the direction indicated by the arrow X1, is based on an increase in influence of the ridge portions of the ceramic element assembly being rounded along with reduction in the size of the ceramic element assembly. That is, it is believed that as the size of the monolithic ceramic electronic component 1 is reduced, a refuge for the electrically conductive adhesive is reduced or the electrically conductive adhesive is squeezed out laterally and, thereby, the center side of a lower surface of the ceramic element assembly is more easily reached.

Therefore, as is clear from the results, regarding the 1608 size, it is preferable that $d_1 > c_1 + 0.10$ g is satisfied. Likewise, it is clearly preferable that $d_1 > c_1 + 0.15$ g is satisfied for the 1005 size, $d_1 > c_1 + 0.20$ g is satisfied for the 0603, and $d_1 > c_1 + 0.25$ g is satisfied for the 0402 size. Therefore, deterioration of the characteristics due to migration of Ag ions can be thereby reliably prevented as in the case of the first preferred embodiment.

Furthermore, in the 1608 sized, the 1005 sized, the 0603 sized, and the 0402 sized monolithic ceramic electronic components, regarding not only the first internal electrode side, but preferably also the second internal electrode side, it is preferable that the distance $d_2$ is set similarly to the distance $d_1$ as in the first preferred embodiment.

Moreover, in the second to fifth preferred embodiments, dimensions of about 1.6 mm×about 0.8 mm×about 0.8 mm, about 1.0 mm×about 0.5 mm×about 0.5 mm, about 0.6 mm×about 0.3 mm×about 0.3 mm, and about 0.4 mm×about 0.2 mm×about 0.2 mm are shown. However, in view of manufacturing tolerances, good results can be obtained similarly to the above description when the dimensions are within the range of about 1.60±0.10 mm×about 0.80±0.10 mm×about 0.80±0.10 mm, about 1.00±0.05 mm×about 0.50±0.05 mm×about 0.50±0.05 mm, about 0.60±0.03 mm×about 0.30±0.03 mm×about 0.30±0.03 mm, and about 0.40±0.02 mm×about 0.20±0.02 mm×about 0.20±0.02 mm, respectively.

Figure 6:
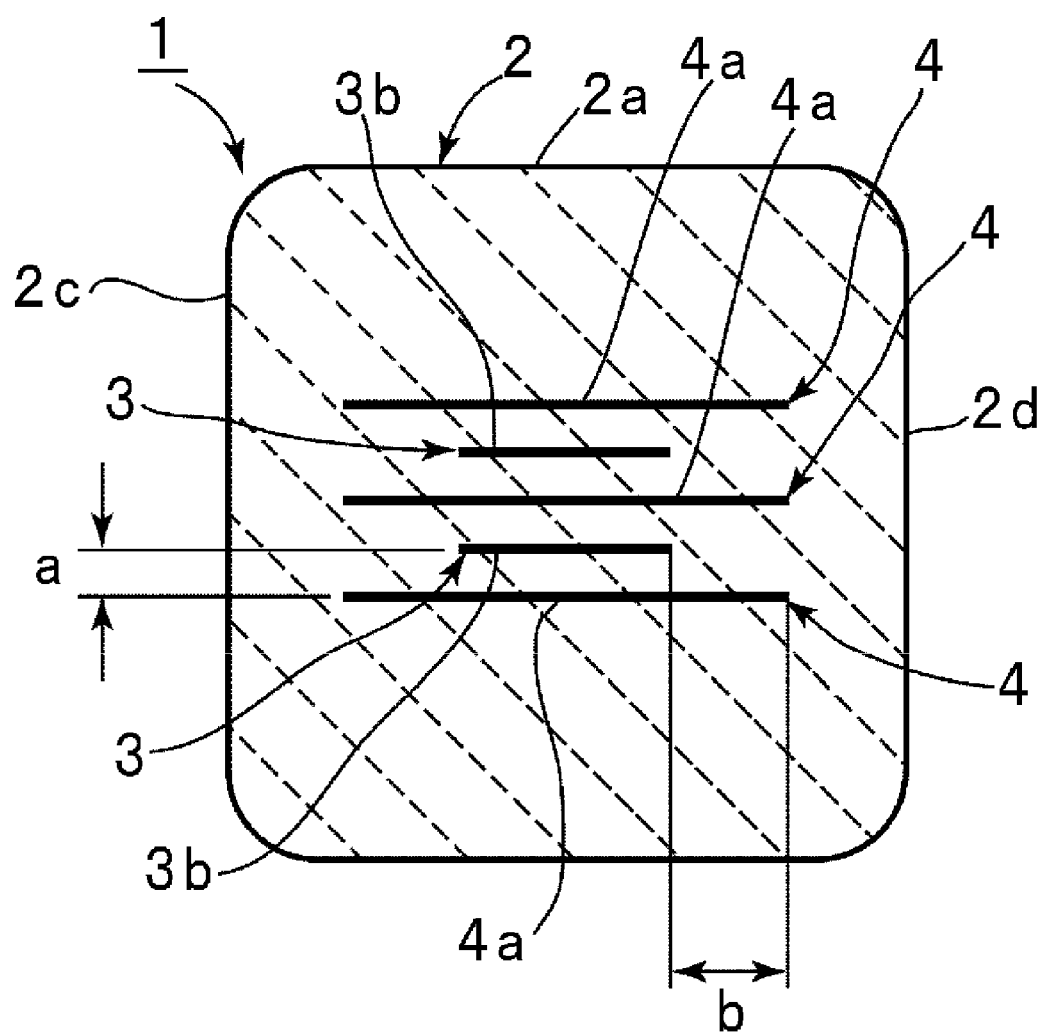
FIG. 6 is a sectional side view of the monolithic ceramic electronic component in the first preferred embodiment of the present invention.

FIG. 6 is a sectional view of the section, which is taken along a line B-B shown in FIG. 1A, of the ceramic element assembly of the monolithic ceramic electronic component 1 according to the first preferred embodiment. In the monolithic ceramic electronic component 1, as described above, the dimension W2 in the width direction of the second region 3b is set to be less than the dimension W1 in the width direction of the first region 3a, and 2b=W1−W2 is satisfied, as described above. Here, where the thickness of the ceramic layer between the first and the second internal electrodes 3 and 4 in the portion in which the first internal electrode 3 and the second internal electrode 4 are overlapped with the ceramic layer therebetween, is a, it is preferable that b is specified to be at least about a/4, for example. Consequently, migration due to a metal filler in the electrically conductive adhesive can be more effectively prevented.

As described above, in the present preferred embodiment, the first and the second internal electrodes are formed substantially equally. Therefore, as shown in FIG. 6, the dimension W2 in the width direction of the second region 3b of the first internal electrode 3 is less than the dimension W3 in the width direction of the third region 4a of the second internal electrode 4 by about 2b. It is preferable that this gap b is set to be at least about a/4, for example, where the thickness of the ceramic layer sandwiched by the internal electrodes is a. Consequently, migration can be more effectively prevented. This will be described with reference to the specific example.

The monolithic ceramic electronic component 1 in the first preferred embodiment was produced in substantially the same manner except that the size of the gap was specified to be a, a/2, a/3, a/4, a/5, a/6, or 0. Then, the mounting structure shown in FIG. 4 was produced in a manner similar to that in the experimental example, and the presence or absence of migration was evaluated by the following method.

An evaluation of the presence or absence of migration was performed. An initial insulation resistance was measured with 4-ch High Resistance Meter (4349B) produced by Agilent Technologies while the ceramic capacitor was mounted on a substrate. Subsequently, a high temperature loading test was conducted at about 150° C. and about 50 V for about 100 hours, and furthermore, a moisture resistance loading test was conducted at about 85° C., relative humidity of about 85%, and about 50 V for about 100 hours. The insulation resistance was measured in a manner similar to the measurement before the test. For a sample exhibiting reduced insulation resistance as compared to the initial insulation resistance, it was assumed that migration was present.

As a result, regarding the individual monolithic ceramic electronic components 1 in which b=a, b=a/2, b=a/3, and b=a/4, migration from the side surface 2c side was not observed. On the other hand, regarding the monolithic ceramic electronic components 1, in which b was a/5 or less, migration was observed with respect to the side surface 1c.

Therefore, as is clear from the experimental example, when the side surface defines the mounting surface, migration of Ag in the electrically conductive adhesive can be reliably prevented by setting b to be at least about a/4, for example. The reason for this is believed to be that the distance between the electrically conductive adhesive 17 and the second region 3b of the internal electrode 3 is ensured sufficiently and, thereby, migration is more reliably prevented.

This is clear from the result of an electric field simulation using a finite element method.

Figure 7A:
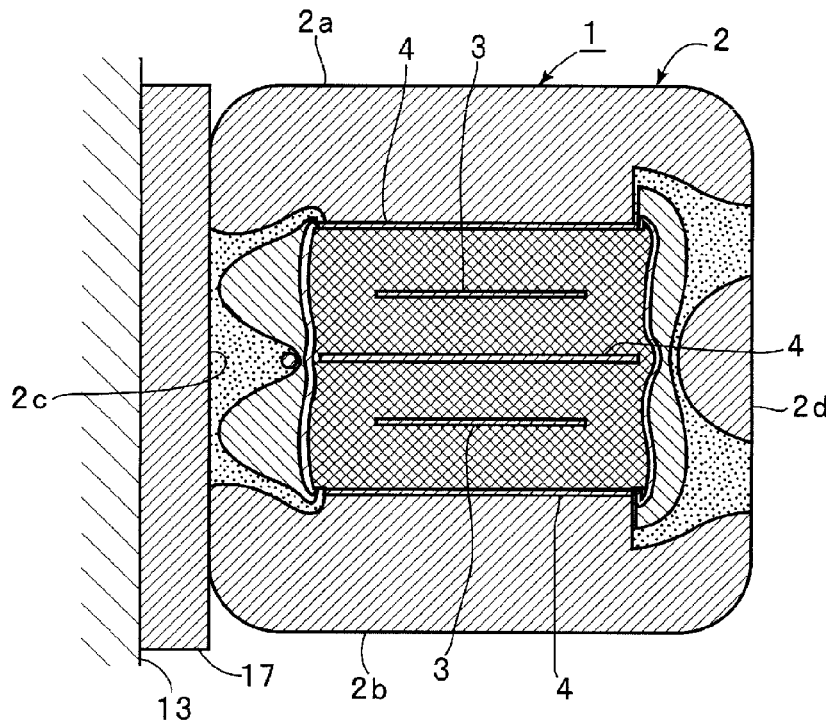
FIG. 7A is a schematic diagram showing the simulation results of the field strength distribution in the mounting structure of the monolithic ceramic electronic component in the first preferred embodiment of the present invention.
Figure 7B:
FIG. 7B is a diagram explaining the field strengths of regions with hatchings in FIG. 7A.
Figure 7B:
Figure 7B:
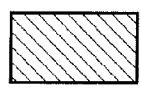
Figure 7B:
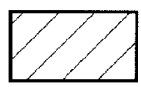
Figure 7B:

The result of the simulation of the field strength in the direction of the cross-section shown in FIG. 6 when the monolithic ceramic electronic component 1 according to the first preferred embodiment is mounted on the mounting substrate 13 from the side surface 1c side with the electrically conductive adhesive by the finite element method is schematically shown in FIG. 7A. In FIG. 7A, the electrically conductive adhesive provided on the mounting substrate 13 is illustrated so as to extend in a vertical direction on the left side. Then, the monolithic ceramic electronic component 1 is connected to the mounting substrate 13 on the left side from the side surface 1c side with the electrically conductive adhesive 17 illustrated on the left side. In this connection, regarding the hatchings shown in FIG. 7A, the portions indicated by the individual hatchings correspond to the portions exhibiting the respective field strengths, as shown in FIG. 7B.

Figure 8:
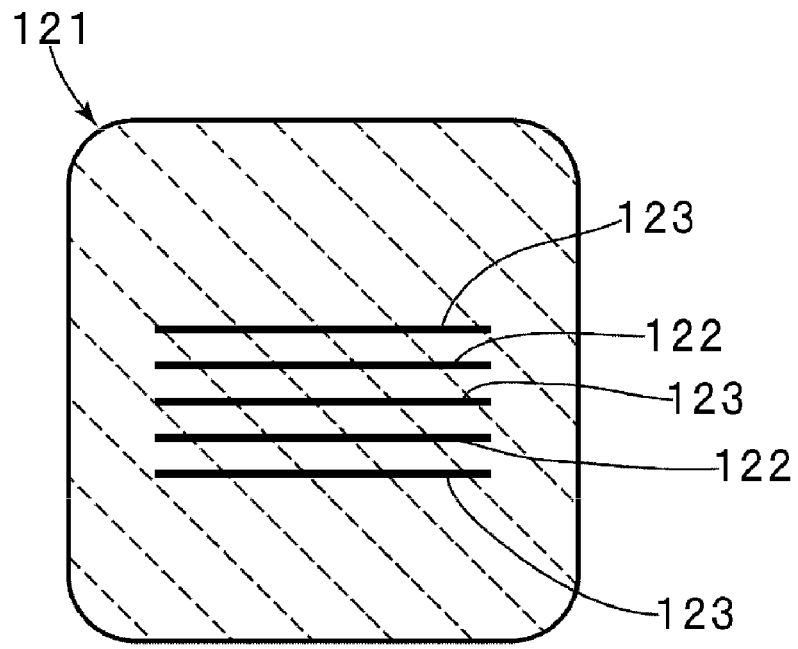
FIG. 8 is a sectional side view of a monolithic ceramic electronic component prepared for the purpose of comparison.
Figure 9:
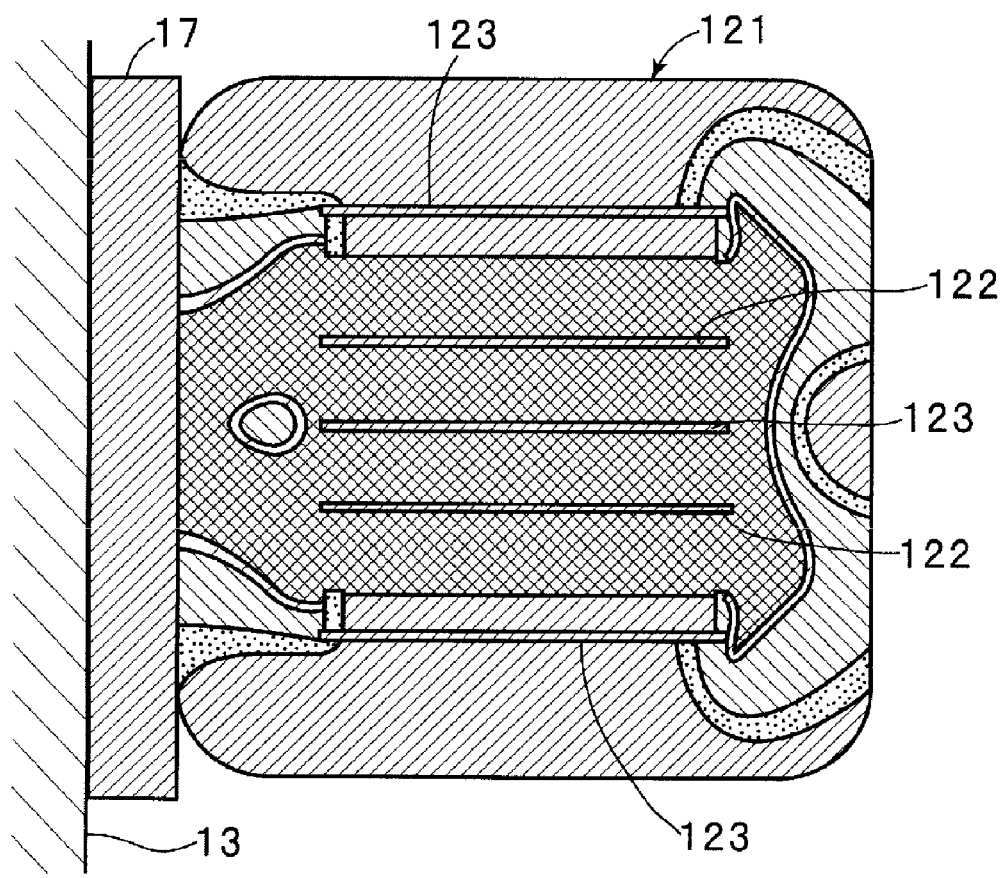
FIG. 9 is a schematic diagram showing the simulation results of the field strength distribution in the mounting structure of the monolithic ceramic electronic component in the comparative example shown in FIG. 8.

For the purpose of comparison, a monolithic ceramic electronic component 121 indicated by a schematic sectional side view shown in FIG. 8 was prepared. This monolithic ceramic electronic component 121 is a monolithic ceramic electronic component formed in a manner similar to that in the present preferred embodiment, except that first and second internal electrodes 122 and 123 having a substantially rectangular shape as a whole are included, i.e., the second and fourth regions are not provided and internal electrodes having a substantially rectangular shape, which is uniform in the width direction, are used. FIG. 9 is a schematic diagram showing the results of a simulation of the field strength when this monolithic ceramic electronic component 121 prepared for the purpose of comparison was mounted on a mounting substrate using an electrically conductive adhesion in substantially the same manner. In FIG. 9, the field strength of each of the portions with a hatching corresponds to the field strength shown in FIG. 7B.

As is clear from a comparison between FIG. 7A and FIG. 9, regarding the monolithic ceramic electronic component 1 in the first preferred embodiment, the distance between the electrically conductive adhesion 17 and the second region 3b of the first internal electrode 3 is relatively large as compared to that in the monolithic ceramic electronic component 121 and, therefore, the field strengths of the regions in the vicinity of the side surface 2c of the ceramic element assembly 2 are reduced. Consequently, it is clear that migration of Ag in the electrically conductive adhesive can be effectively prevented.

Figure 10:
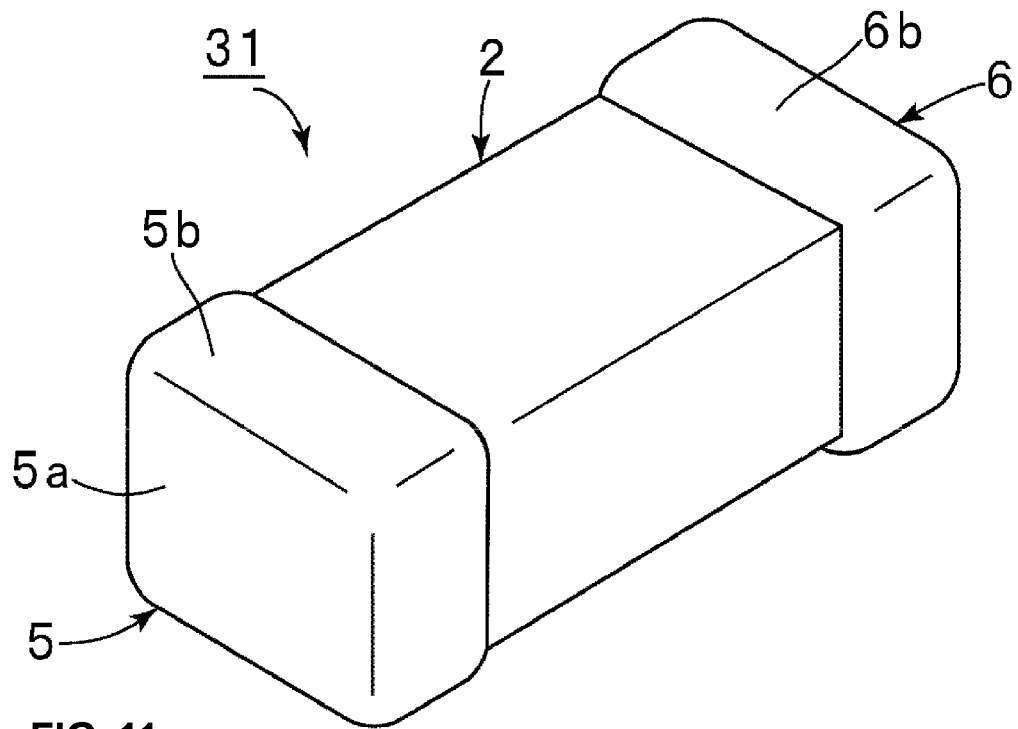
FIG. 10 is a perspective view showing the outward appearance of a monolithic ceramic electronic component according to a sixth preferred embodiment of the present invention.
Figure 11:
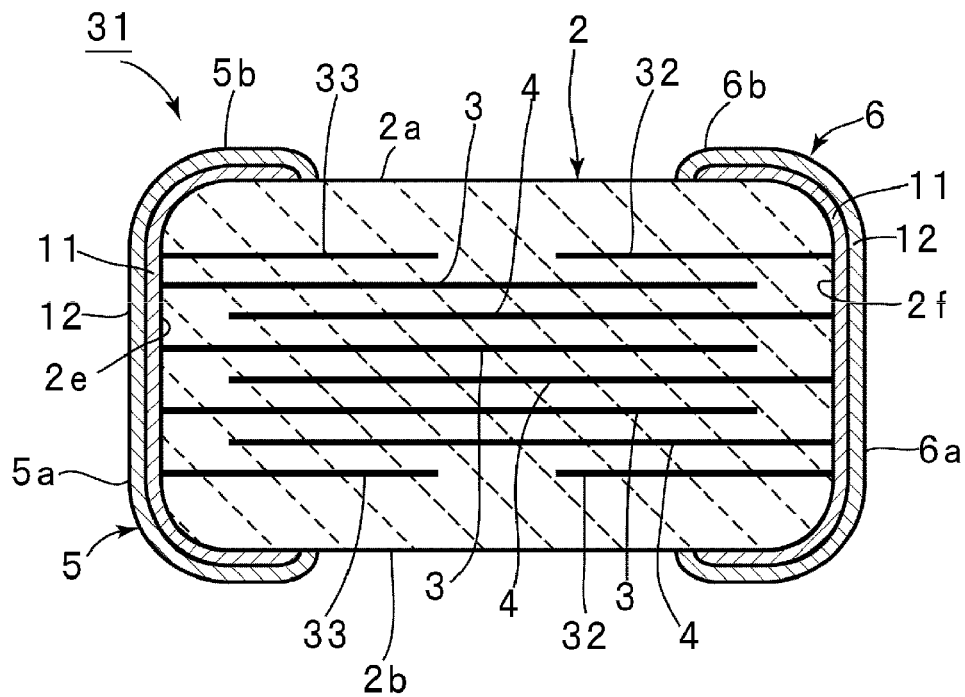
FIG. 11 is a sectional front view of the monolithic ceramic electronic component according to the sixth preferred embodiment of the present invention.

FIG. 10 and FIG. 11 are a perspective view and a sectional front view of a monolithic ceramic electronic component according to a sixth preferred embodiment of the present invention.

A monolithic ceramic electronic component 31 in the sixth preferred embodiment is formed in a manner similar to that of the monolithic ceramic electronic component 1 according to the first preferred embodiment except that third and fourth internal electrodes 32 and 33 shown in FIG. 11 are included. Therefore, the same portions are indicated by the same reference numerals and the explanations thereof are omitted.

Figure 12:
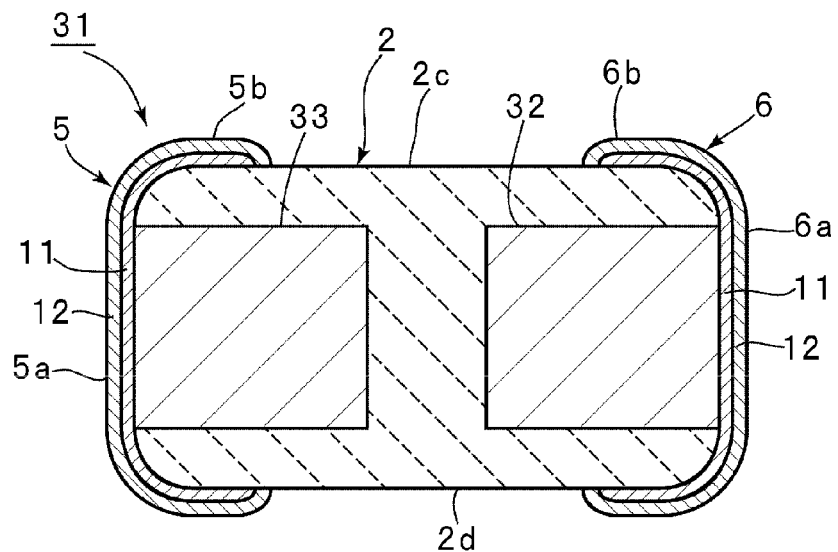
FIG. 12 is a sectional plan view of the monolithic ceramic electronic component according to the sixth preferred embodiment of the present invention.
Figure 13:
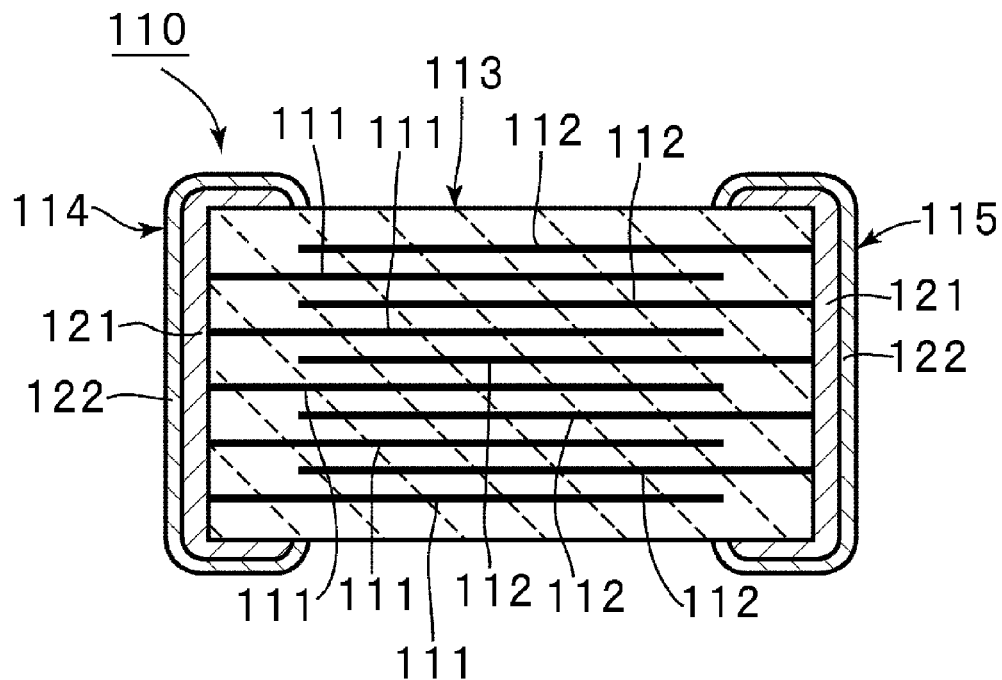
FIG. 13 is a schematic sectional front view for explaining a conventional monolithic ceramic electronic component.

In the monolithic ceramic electronic component 31 in the sixth preferred embodiment, the third internal electrodes 32 and the fourth internal electrodes 33 are further laminated outside a portion in which the first and the second internal electrodes 3 and 4 are laminated in the lamination direction. As indicated by a sectional plan view shown in FIG. 12, the third internal electrode 32 extends to a second end surface 2f, and the fourth internal electrode 33 extends to a first end surface 2e. The third internal electrodes 32 and the fourth internal electrodes 33 are disposed at the same or substantially the same height position in the ceramic element assembly 2, and front ends thereof are opposed to each other with a predetermined gap therebetween.

In the side of a first principal surface 2a, the third internal electrodes 32 extending to the second end surface 2f are disposed between the first internal electrode 3 closest to the first principal surface 2a and the first principal surface 2a. The third internal electrodes 32 are arranged so as to overlap at least a portion of a second region 3b of the first internal electrode 3 closest to the first principal surface 2a. Therefore, the third internal electrode 32 is disposed between the second region of the first internal electrode 3 closest to the first principal surface 2a and a second wraparound portion 6b of a second external terminal electrode 6 connected to a potential opposite to the first internal electrode 3 and, thereby, the field strength between the first internal electrode 3 closest to the first principal surface 2a and the second wraparound portion 6b can be reduced. Consequently, when mounting is performed from the first principal surface 2a using an electrically conductive adhesion, migration can be effectively prevented.

In addition, in the side of a first external terminal electrode 5, when mounting is performed from the side of the first side surface 2c, the electrically conductive adhesion 16 crosses the front end of a first wraparound portion 5b of the first external terminal electrode 5 and extends to the side. However, the fourth internal electrodes 33 is disposed between the second internal electrode 4 closest to the first principal surface 2a and the first principal surface 2a. Therefore, the field strength does not increase on the side of the first external terminal electrode 5, and migration does not readily occur.

Conversely, when mounting is performed from the side of the second principal surface 2b, the lower fourth internal electrodes 33 are disposed between the second internal electrode 4 closest to the second principal surface 2b and the first wraparound portion 5b and, thereby, the field strength between the fourth region of the second internal electrode and the first wraparound portion 5b can be reduced by the presence of the fourth internal electrode 33. Consequently, on the side of the second principal surface 2b, migration of Ag in a portion adjacent to the front end of the first wraparound portion 5b can be effectively prevented.

In addition, in the side of the second external terminal electrode 6, the third internal electrodes 32 is present between the second internal electrode 4 closest to the second principal surface 2b and the second principal surface 2b and, thereby, the field strength can be reduced.

Although not specifically limited, in the present preferred embodiment, the third internal electrode 32 is preferably disposed on the side of the second principal surface 2b and the fourth internal electrode 33 is preferably disposed on the side of the first principal surface 2a side and, therefore, the same or substantially the same structure may be provided above and below the portion in which the first and the second internal electrodes are laminated. Consequently, the symmetry of the structure of the monolithic ceramic electronic component 1 can be improved. Furthermore, the same electrode pattern can be used as electrode patterns for forming the third and the fourth internal electrodes 32 and 33. Therefore, simplification of the production process can be achieved.

Regarding the first to the sixth preferred embodiments, the monolithic ceramic electronic components in which the first and the second internal electrodes are preferably laminated with the ceramic layers therebetween are described. However, preferred embodiments of the present invention can be applied to not only capacitors, but also various other electronic components, e.g., thermistors, piezoelectric actuators, and ceramic multilayer substrates, insofar as the monolithic ceramic electronic component is produced by laminating the first and the second internal electrodes in the same or similar manner.

Moreover, the electrically conductive adhesion used to mount the mounting structure according to preferred embodiments of the present invention and the monolithic ceramic electronic component according to preferred embodiments of the present invention is not limited to those in which the metal filler is filled in the epoxy resin, but may also be those in which the metal filler is filled in thermosetting resins, e.g., phenol resins, other than the epoxy resin. Furthermore, the metal filler is not limited to the Ag powder, and fillers made other metals or alloys, e.g., Cu, which may cause migration, may be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A mounting structure of a monolithic ceramic capacitor comprising:
a monolithic ceramic capacitor including:
a ceramic element assembly including a plurality of laminated ceramic layers and including first and second principal surfaces which extend parallel or substantially parallel to the ceramic layers and which are opposed to each other, first and second side surfaces which connect the first and the second principal surfaces and which are opposed to each other, and first and second end surfaces which connect the first and the second principal surfaces and which are opposed to each other;
first internal electrodes which are disposed between the ceramic layers in the ceramic element assembly and which extend to the first end surface;
second internal electrodes which are disposed between the ceramic layers in the ceramic element assembly, which extend to the second end surface, and which are electrically insulated from the first internal electrodes with at least one layer of the ceramic layer disposed therebetween;
a first external terminal electrode including a first end surface portion which is disposed on the first end surface so as to be electrically connected to the first internal electrodes, and a first wraparound portion which is connected to the first end surface portion and which extends onto the first and the second principal surfaces and the first and the second side surfaces; and
a second external terminal electrode including a second end surface portion which is electrically connected to the second internal electrodes and which is disposed on the second end surface, and a second wraparound portion which is connected to the second end surface portion and which extends onto the first and the second principal surfaces and the first and the second side surfaces;
a mounting substrate including first and second lands electrically connected to the first and the second external terminal electrodes, respectively; and
first and second electrically conductive adhesives which connect the first and the second external terminal electrodes to the first and the second lands of the mounting substrate; wherein
the first internal electrodes include a first region extending to the first end surface and a second region which is connected to the first region and which is disposed inward from the first region in the ceramic element assembly;
the first region has a substantially rectangular shape and includes opposed edges that are spaced apart from one another in a width direction of the first region and that extend in a longitudinal direction of the monolithic ceramic capacitor;
all portions of the second region are spaced inwardly in the width direction of the first region from each of the opposed edges of the first region;
the second region includes a front edge that extends in a width direction of the second region that is substantially perpendicular to the longitudinal direction of the monolithic ceramic capacitor;
a dimension of the front edge in the width direction of the second region is less than a dimension of the first region in the width direction of the first region that is substantially perpendicular to the longitudinal direction of the monolithic capacitor;

the dimension in the width direction of the first region is less than a dimension between the first side surface and the second side surface of the ceramic element;

no portion of the first internal electrodes extends to either of the first side surface or the second side surface;

the monolithic ceramic capacitor is mounted on the mounting substrate with the first side surface defining a mounting surface;

the second electrically conductive adhesive disposed at least on the second land extends around from the second external terminal electrode to the first side surface of the ceramic element assembly so as to come into contact with the first side surface;

an end point which is located at a position closest in the first region of the first internal electrodes to the first side surface and closest to the second end surface does not overlap the second electrically conductive adhesive in a height direction of the monolithic ceramic capacitor in the mounting structure; and the end point is arranged between a midpoint in a length direction of the monolithic ceramic capacitor and the second end surface.

2. The mounting structure of a monolithic ceramic capacitor according to claim 1, wherein the first and second electrically conductive adhesives include Ag.

* * * * *